United States Patent
O'Neill et al.

(10) Patent No.: US 10,437,137 B2
(45) Date of Patent: Oct. 8, 2019

(54) REMOVABLE LENSES FOR MOBILE DEVICES WITH ON-BOARD CAMERA

(71) Applicant: PORTERO HOLDINGS, LLC, Lake Forest, CA (US)

(72) Inventors: Patrick D. O'Neill, Huntington Beach, CA (US); Chong Pak, Lakewood, CA (US); Jason Patrick, Long Beach, CA (US); Daniel Arato, Los Angeles, CA (US)

(73) Assignee: Portero Holdings, LLC, Lake Forest, CA (US)

( * ) Notice: Subject to any disclaimer, the term of this patent is extended or adjusted under 35 U.S.C. 154(b) by 0 days.

(21) Appl. No.: 16/146,528

(22) Filed: Sep. 28, 2018

(65) Prior Publication Data

US 2019/0033694 A1   Jan. 31, 2019

Related U.S. Application Data

(63) Continuation of application No. 14/676,723, filed on Apr. 1, 2015, now Pat. No. 10,088,738.

(60) Provisional application No. 62/061,831, filed on Oct. 9, 2014, provisional application No. 62/048,171, filed on Sep. 9, 2014, provisional application No. 62/046,817, filed on Sep. 5, 2014, provisional
(Continued)

(51) Int. Cl.
| | |
|---|---|
| *G03B 17/00* | (2006.01) |
| *G03B 17/56* | (2006.01) |
| *G02B 7/02* | (2006.01) |
| *H04M 1/02* | (2006.01) |

(52) U.S. Cl.
CPC ........... *G03B 17/565* (2013.01); *G02B 7/021* (2013.01); *G03B 17/566* (2013.01); *H04M 1/0264* (2013.01)

(58) Field of Classification Search
CPC ................................ G03B 17/56; G03B 17/00
USPC ........................... 396/529; 348/360; 359/703
See application file for complete search history.

(56) References Cited

U.S. PATENT DOCUMENTS

| | | |
|---|---|---|
| 971,798 A | 10/1910 | Somdal |
| D48,816 S | 4/1916 | De Ville |
| (Continued) | | |

FOREIGN PATENT DOCUMENTS

| | | |
|---|---|---|
| CN | 1797169 A | 7/2006 |
| CN | 201173987 Y | 12/2008 |
| (Continued) | | |

OTHER PUBLICATIONS kickstarter.com, "Glif-iPhone 4 Tripod Mount & Stand", http://www.kickstarter.com/projects/danprovost/glif-iphone-4-tripod-mount-and-stand, Oct. 3, 2013 [selected screenshots from video], 1 page.
(Continued)

*Primary Examiner* — Clayton E. LaBalle
*Assistant Examiner* — Fang-Chi Chang
(74) *Attorney, Agent, or Firm* — Dorsey & Whitney LLP

(57) ABSTRACT

Disclosed in some examples are auxiliary optical systems for removably attaching to mobile devices, including mobile telephones with onboard cameras, to provide enhanced optical features. Some auxiliary optical systems can be configured to attach to multiple different types and sizes of mobile devices. Some auxiliary optical systems can be configured to attach to a mobile device that includes a protruding onboard camera. For example, in some embodiments, a retainer portion of an auxiliary optical system can comprise a region for receiving the protruding onboard camera in a clearance or friction fit.

19 Claims, 18 Drawing Sheets

Related U.S. Application Data application No. 61/990,012, filed on May 7, 2014, provisional application No. 61/978,769, filed on Apr. 11, 2014.

(56) References Cited

U.S. PATENT DOCUMENTS

| | | |
|---|---|---|
| D138,816 S | 9/1944 | Glasser |
| D141,692 S | 6/1945 | Nemeth |
| 2,428,719 A | 10/1947 | Nemeth |
| D148,816 S | 2/1948 | Pemstein |
| D181,908 S | 1/1958 | Hertzler |
| D183,253 S | 7/1958 | Gebele |
| 3,090,282 A | 5/1963 | Pierre |
| 3,133,140 A | 5/1964 | Paul |
| 3,138,060 A | 6/1964 | Joachim et al. |
| 3,454,323 A | 7/1969 | Dierks et al. |
| 3,620,149 A | 11/1971 | Ogihara |
| 3,680,461 A | 8/1972 | Amesbury et al. |
| 3,796,489 A | 3/1974 | Sone et al. |
| 3,817,601 A | 6/1974 | Colaiace et al. |
| 3,828,991 A | 8/1974 | Mac |
| D234,007 S | 12/1974 | Ritter |
| D248,160 S | 6/1978 | Feinbloom et al. |
| 4,264,167 A | 4/1981 | Plummer |
| 4,305,386 A | 12/1981 | Tawara |
| D264,048 S | 4/1982 | Magner |
| D274,336 S | 6/1984 | Huckenbeck |
| D274,691 S | 7/1984 | Wallace |
| D275,766 S | 10/1984 | Suzuki |
| D295,871 S | 5/1988 | Charles |
| 4,760,510 A | 7/1988 | Lahti |
| 4,864,333 A | 9/1989 | Barber |
| 4,893,143 A | 1/1990 | Sheng-huei |
| 5,050,963 A | 9/1991 | Murakami |
| 5,054,886 A | 10/1991 | Ozaki et al. |
| 5,311,358 A | 5/1994 | Pederson et al. |
| 5,416,544 A | 5/1995 | Stapleton |
| 5,455,711 A | 10/1995 | Palmer |
| 5,461,444 A | 10/1995 | Okura et al. |
| D374,878 S | 10/1996 | Palmer |
| D381,347 S | 7/1997 | Miyahara |
| D387,787 S | 12/1997 | Palmer |
| 5,781,351 A | 7/1998 | Murakami et al. |
| 5,831,778 A | 11/1998 | Chueh |
| 6,115,197 A | 9/2000 | Funahashi |
| 6,545,825 B2 | 4/2003 | Shoji et al. |
| 6,752,516 B1 | 6/2004 | Beadle |
| 6,889,006 B2 | 5/2005 | Kobayashi |
| 6,924,950 B2 | 8/2005 | Gventer et al. |
| 6,967,790 B2 | 11/2005 | Wei |
| D544,512 S | 6/2007 | Huang |
| D546,863 S | 7/2007 | Ito et al. |
| D560,702 S | 1/2008 | Tokiwa et al. |
| 7,600,932 B2 | 10/2009 | Senba et al. |
| 7,604,423 B2 | 10/2009 | Nagata et al. |
| 7,636,518 B2 | 12/2009 | Tanaka et al. |
| 7,639,353 B2 | 12/2009 | Rooke |
| D617,360 S | 6/2010 | Endo et al. |
| 7,782,375 B2 | 8/2010 | Chambers et al. |
| 7,967,513 B2 | 6/2011 | Zhang |
| 8,000,589 B2 | 8/2011 | Chan |
| 8,040,621 B2 | 10/2011 | Chang et al. |
| D649,970 S | 12/2011 | Lyford et al. |
| D650,821 S | 12/2011 | Verhey |
| 8,073,324 B2 | 12/2011 | Tsai |
| 8,208,210 B2 | 6/2012 | An et al. |
| 8,279,544 B1 | 10/2012 | O'neill |
| D678,379 S | 3/2013 | Oneill |
| D686,265 S | 7/2013 | Oneill et al. |
| 8,508,868 B2 | 8/2013 | Weber et al. |
| D692,472 S | 10/2013 | Samuels et al. |
| 8,573,810 B2 | 11/2013 | Mahaffey et al. |
| 8,593,745 B2 | 11/2013 | O'neill |
| D695,295 S | 12/2013 | Chumanov et al. |
| D695,332 S | 12/2013 | O'Neill |
| D697,957 S | 1/2014 | Glasse et al. |
| D697,958 S | 1/2014 | Oneill et al. |
| 8,639,106 B1 | 1/2014 | Gleason et al. |
| D699,275 S | 2/2014 | Samuels et al. |
| D700,228 S | 2/2014 | Oneill et al. |
| 8,687,299 B1 | 4/2014 | Sanford et al. |
| 8,760,569 B2 | 6/2014 | Yang |
| D708,652 S | 7/2014 | Hyers |
| D708,653 S | 7/2014 | Hyers |
| 8,891,187 B2 | 11/2014 | O'neill |
| D723,601 S | 3/2015 | Oneill et al. |
| D726,796 S | 4/2015 | Oneill et al. |
| D727,385 S | 4/2015 | Oneill et al. |
| D727,868 S | 4/2015 | Oneill et al. |
| 9,007,522 B1 | 4/2015 | O'neill et al. |
| D730,967 S | 6/2015 | Oneill et al. |
| D730,968 S | 6/2015 | Oneill et al. |
| D730,969 S | 6/2015 | Oneill et al. |
| D740,878 S | 10/2015 | Oneill et al. |
| D754,228 S | 4/2016 | Oneill et al. |
| 10,088,738 B2 | 10/2018 | O'neill et al. |
| 2004/0218081 A1 | 11/2004 | Lohr et al. |
| 2005/0088612 A1 | 4/2005 | Smith et al. |
| 2005/0099526 A1 | 5/2005 | Wu et al. |
| 2007/0049340 A1 | 3/2007 | Wang et al. |
| 2007/0053682 A1 | 3/2007 | Chang |
| 2007/0196090 A1 | 8/2007 | Kubo |
| 2007/0275763 A1 | 11/2007 | Sawadski et al. |
| 2007/0280677 A1 | 12/2007 | Drake et al. |
| 2008/0174891 A1 | 7/2008 | Kudoh |
| 2009/0109558 A1 | 4/2009 | Schaefer |
| 2009/0169198 A1 | 7/2009 | Chang |
| 2009/0181729 A1 | 7/2009 | Griffin et al. |
| 2010/0048243 A1 | 2/2010 | Fourquin et al. |
| 2010/0328420 A1 | 12/2010 | Roman |
| 2011/0043683 A1 | 2/2011 | Beach et al. |
| 2011/0110654 A1 | 5/2011 | Maki |
| 2012/0157160 A1 | 6/2012 | Ozcan et al. |
| 2013/0028591 A1 | 1/2013 | Hicks |
| 2013/0094846 A1 | 4/2013 | Apter |
| 2013/0107109 A1 | 5/2013 | Yang |
| 2013/0148954 A1 | 6/2013 | Uehara et al. |
| 2013/0206614 A1 | 8/2013 | Oneill et al. |
| 2014/0071547 A1 | 3/2014 | O'neill et al. |
| 2014/0078594 A1 | 3/2014 | Springer |
| 2014/0253789 A1 | 9/2014 | O'neill |
| 2014/0267882 A1 | 9/2014 | O'neill et al. |
| 2014/0320987 A1 | 10/2014 | O'neill |
| 2015/0116851 A1 | 4/2015 | O'neill et al. |
| 2015/0172522 A1 | 6/2015 | O'neill et al. |

FOREIGN PATENT DOCUMENTS

| | | |
|---|---|---|
| CN | 102804018 A | 11/2012 |
| JP | 2000311427 A | 11/2000 |
| JP | 2004191897 A | 7/2004 |
| JP | 2006251150 A | 9/2006 |
| JP | 2007079362 A | 3/2007 |
| JP | 2007206137 A | 8/2007 |
| JP | 2007219433 A | 8/2007 |
| KR | 100842373 B1 | 7/2008 |
| WO | 2006002674 A1 | 1/2006 |
| WO | 2012082738 A1 | 6/2012 |
| WO | 2012128936 A1 | 9/2012 |
| WO | 2014043266 A1 | 3/2014 |

OTHER PUBLICATIONS amazon.com, "Fish Eye lens+ Wide Angle Lens+ Macro Lens 3-in-1 Kit for iPad iPhone 4g", printed Feb. 3, 2012 [Customer Reviews included], 10 pages.

Olloclip for Android?, "AT&T Samsung Galaxy S II Skyrocket SGH-1727 XDA Forums" http://forum.xda-developers.com/showthread. php?t=1721172, printed Nov. 9, 2014 [Specifically Customer Comment Dated Jul. 22, 2013], 3 pages.

Strietelmeier, "Use Your 37mm DSLR Lenses with your Samsung Galaxy S4,", http://the-gadgeteer.com/2013/06/09/use-your-37mm-dslr-lenses-with-your-samsung-galaxy-s4/, Jun. 9, 2013 6 pages.

(56) References Cited

OTHER PUBLICATIONS

Camera licious.com, "4 in One Samsung Lens—S3/S4/Note2/Note3", http://www.camera-licious.com/4-in-one-Samsung-Phone-Camera-Lens-Wide-Angle-Macro-Fisheye-Lens, printed Nov. 9, 2014, 7 pages.

amazon.com, "Universal Smart Phone Camera Lens Kit," http:www.amazon.com/Universal-Camera-including-Telephoto-Microfiber/, printed Nov. 9, 2014, 5 pages.

FOCAL "Auxiliary Lens Set for Kodak Disc Camera" circa 1980, 1 page.

PCT International Search Report, PCT Application No. PCT/US2015/024660 dated Jun. 22, 2015, 2 pages.

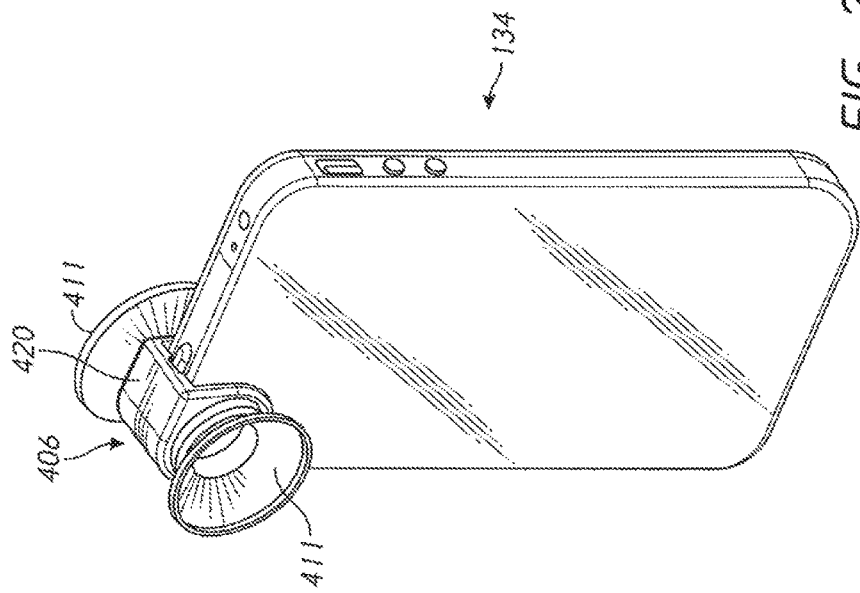
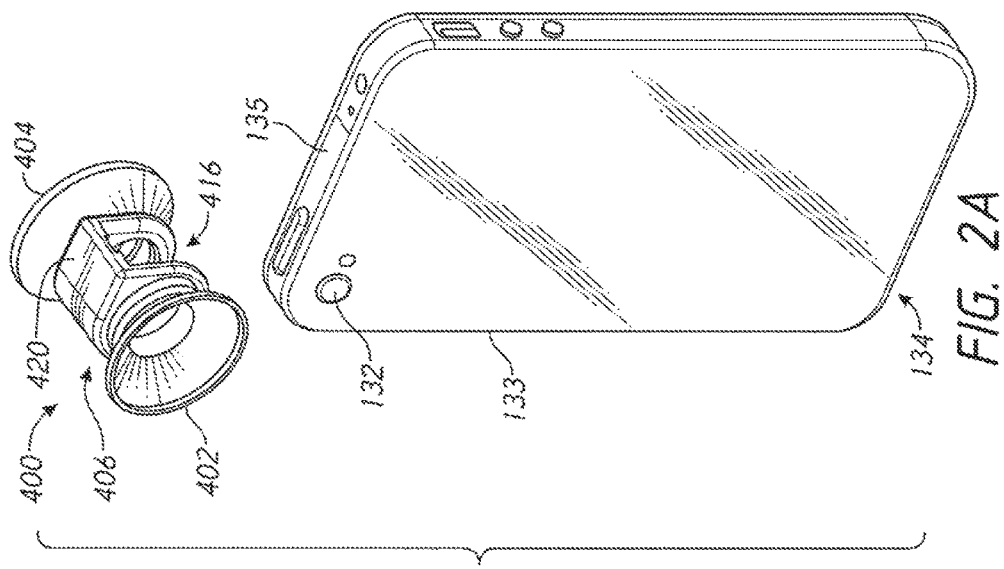

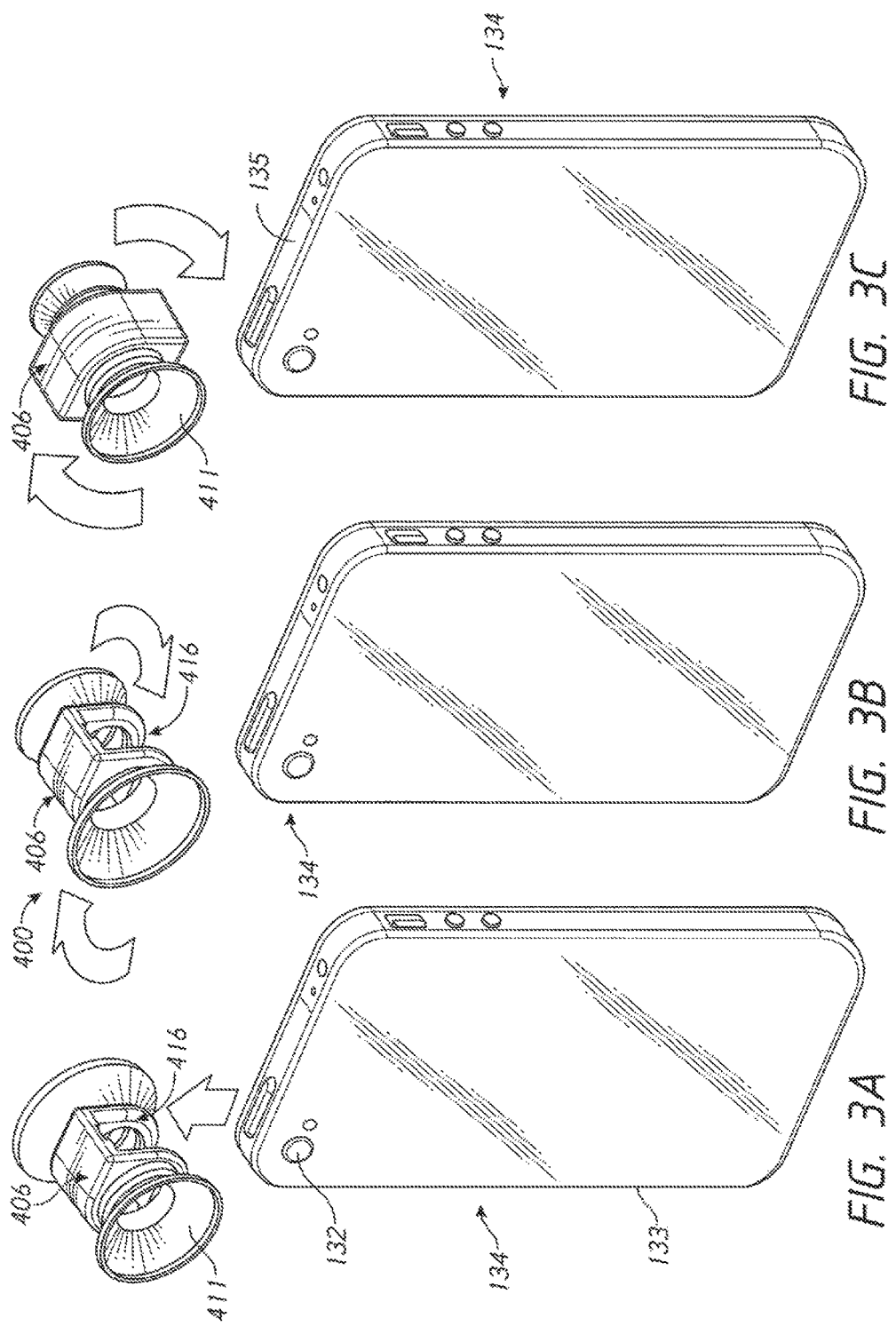

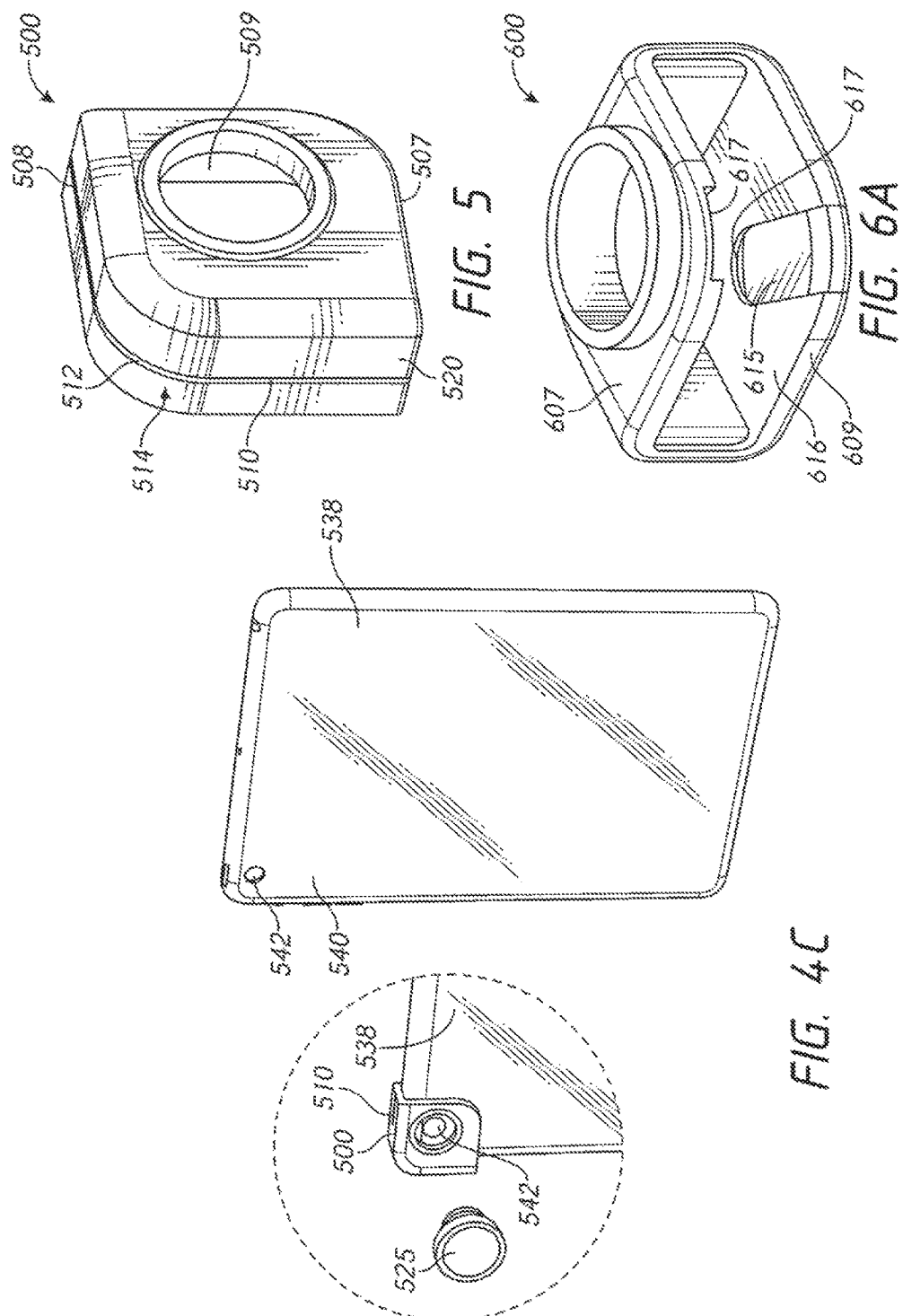

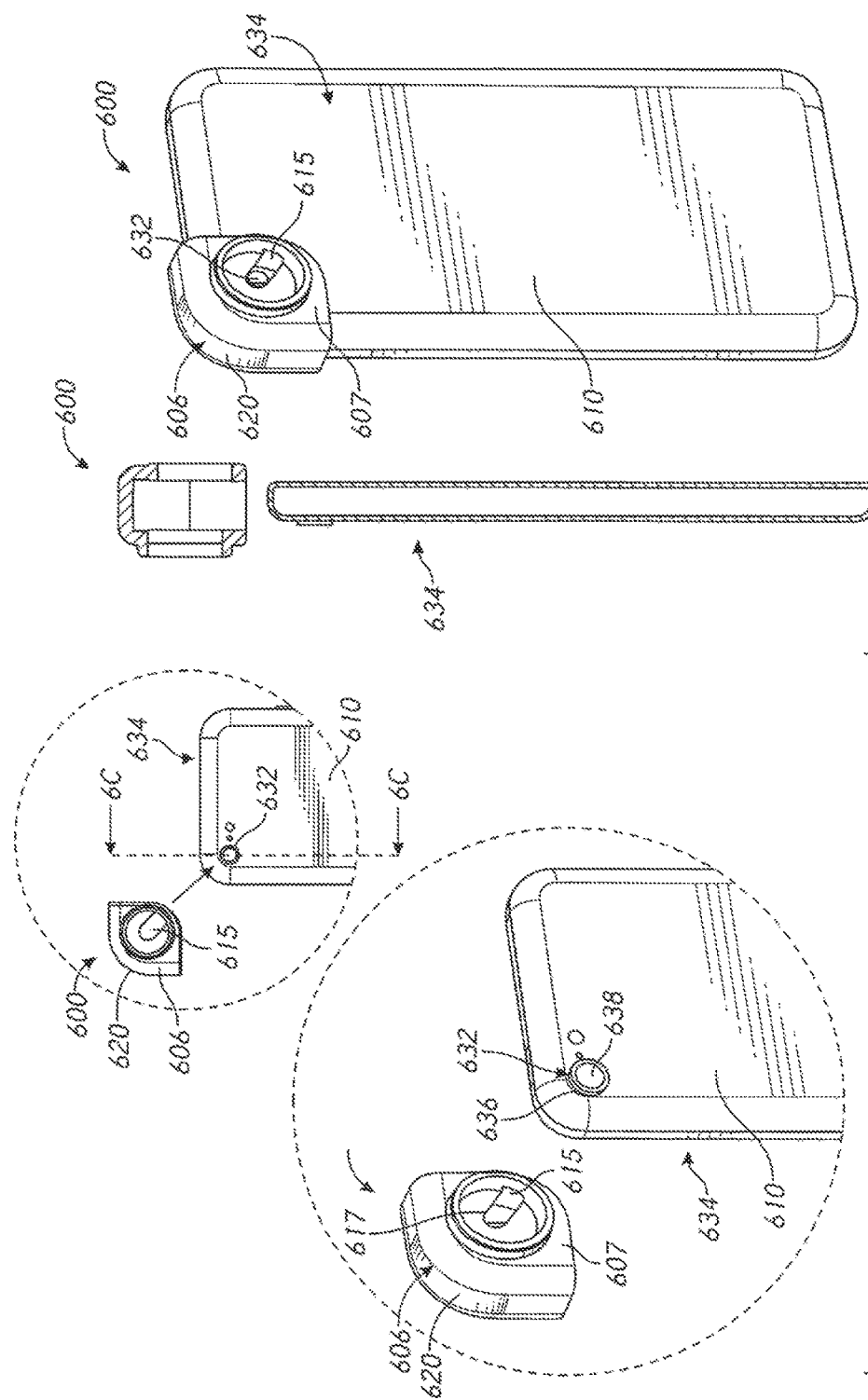

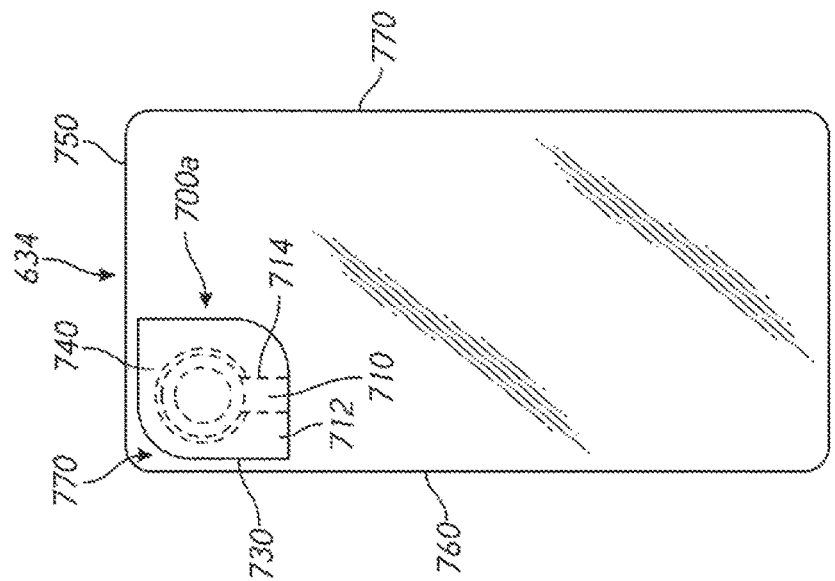
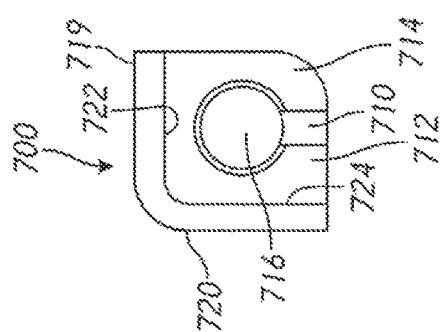
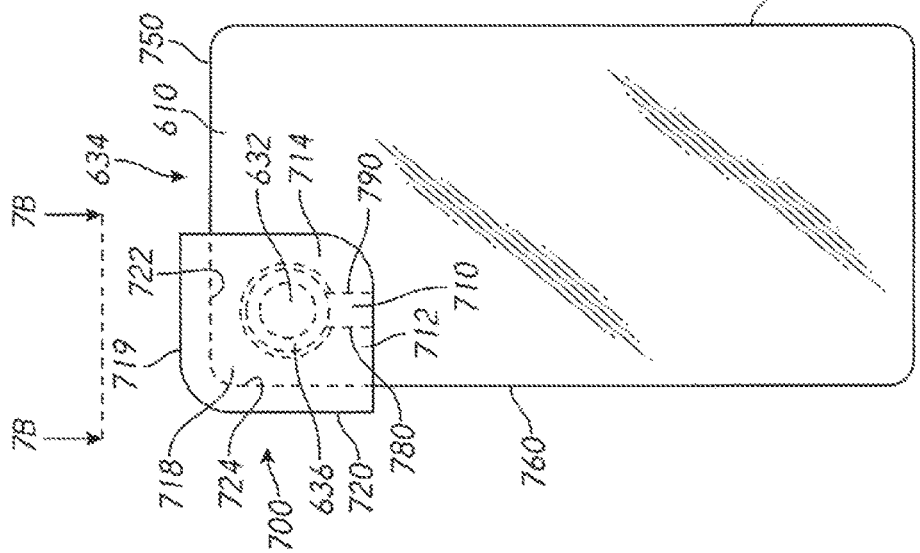

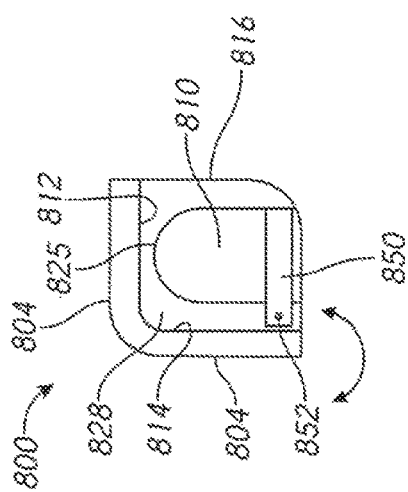
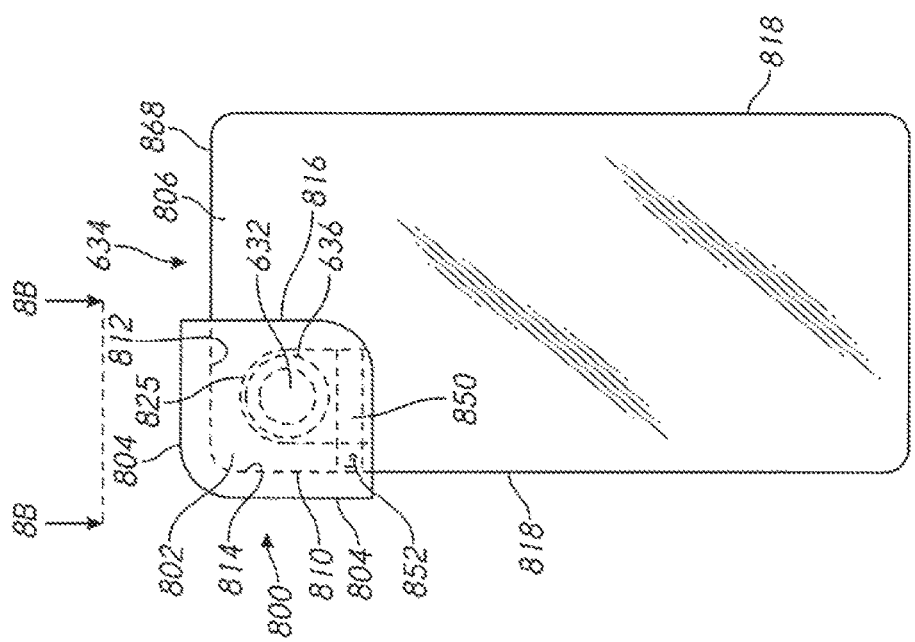
FIG. 8B
FIG. 8A

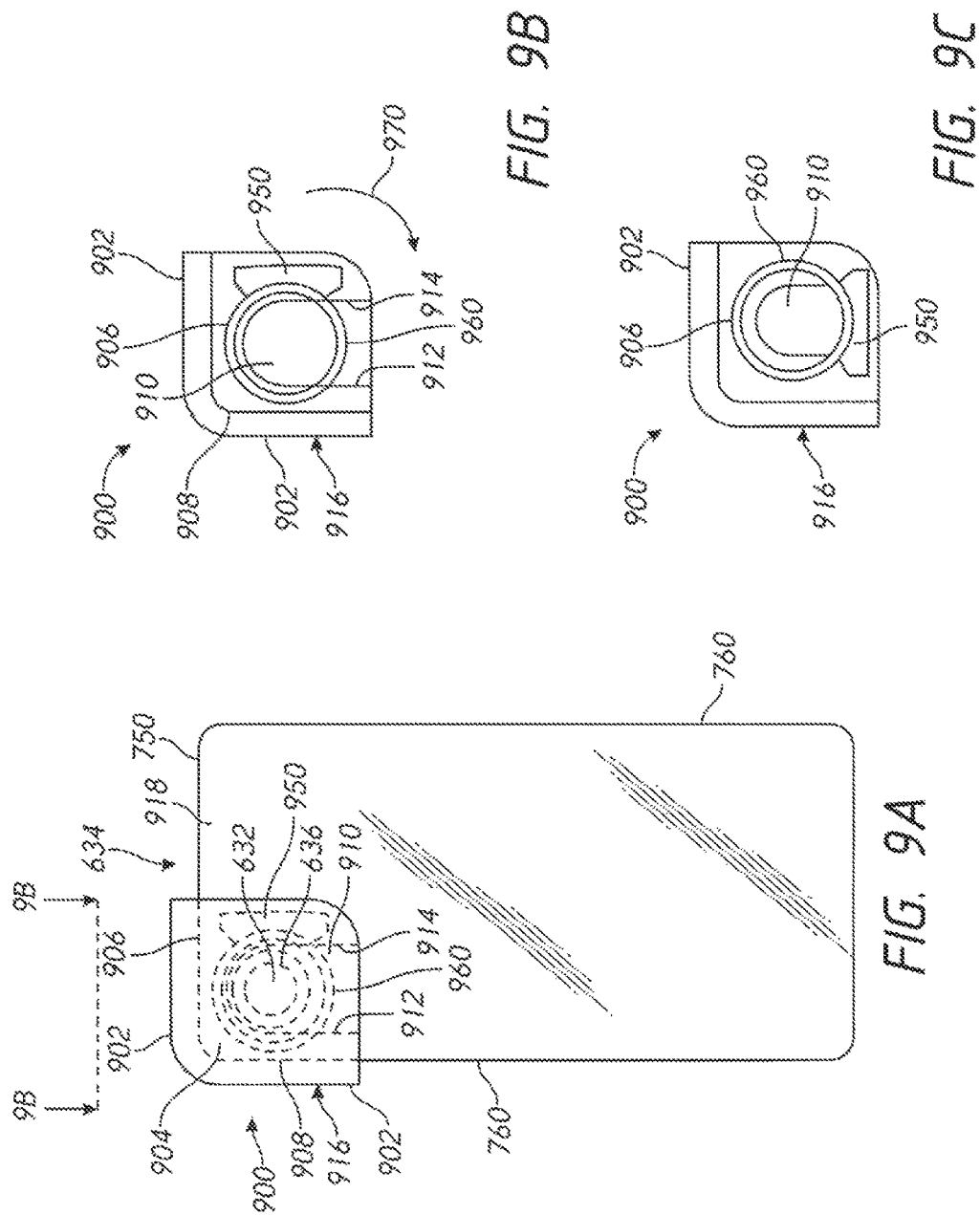

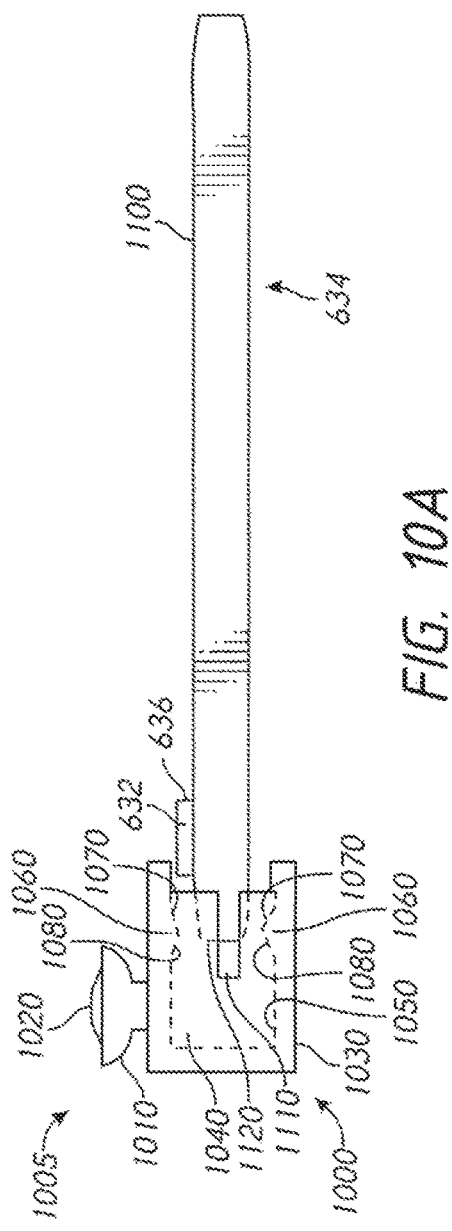
FIG. 10A
FIG. 10B
FIG. 10C

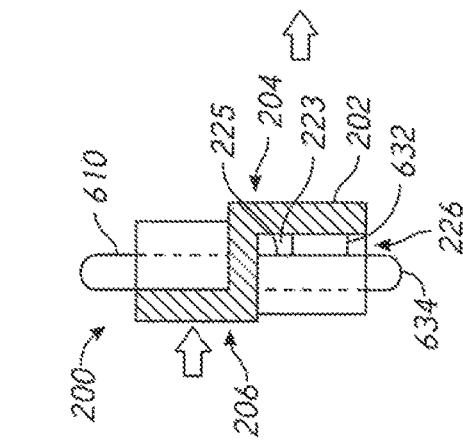
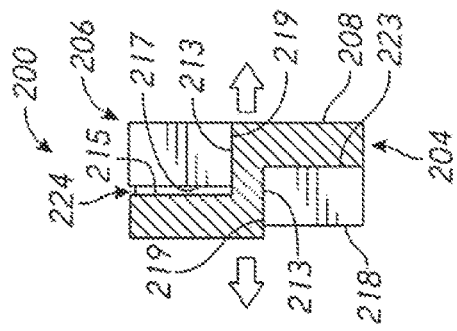
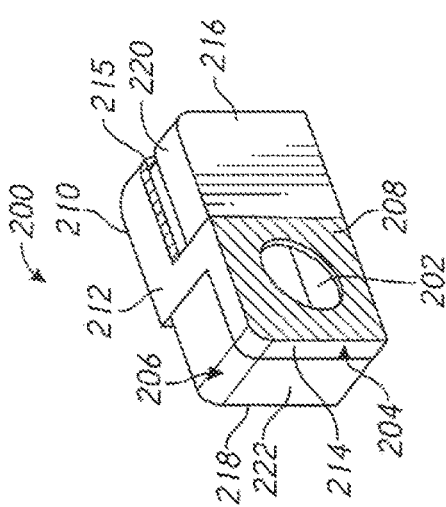
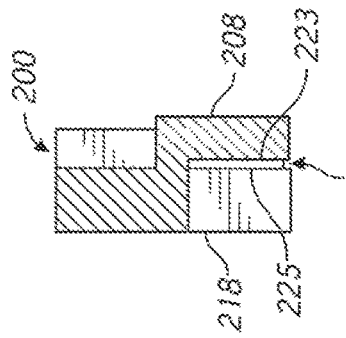
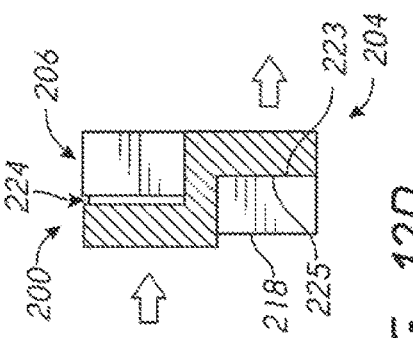

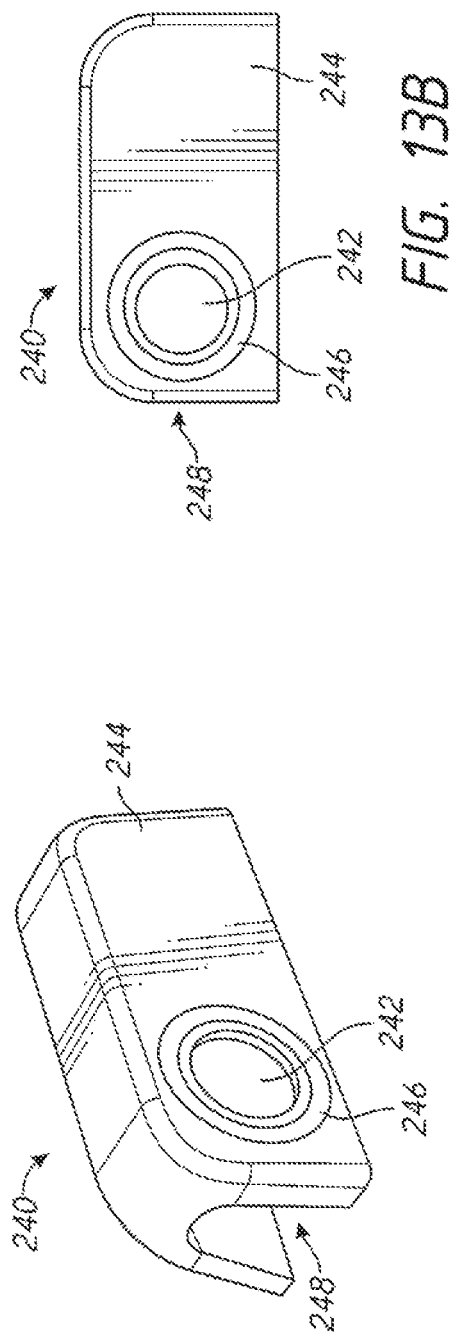
FIG. 13A
FIG. 13B
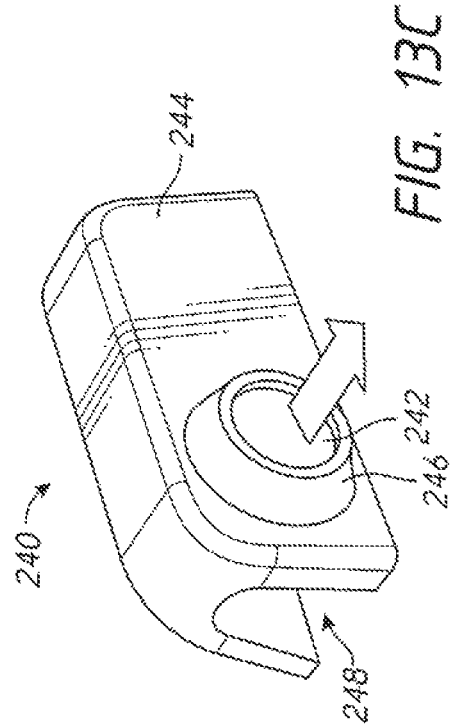
FIG. 13C

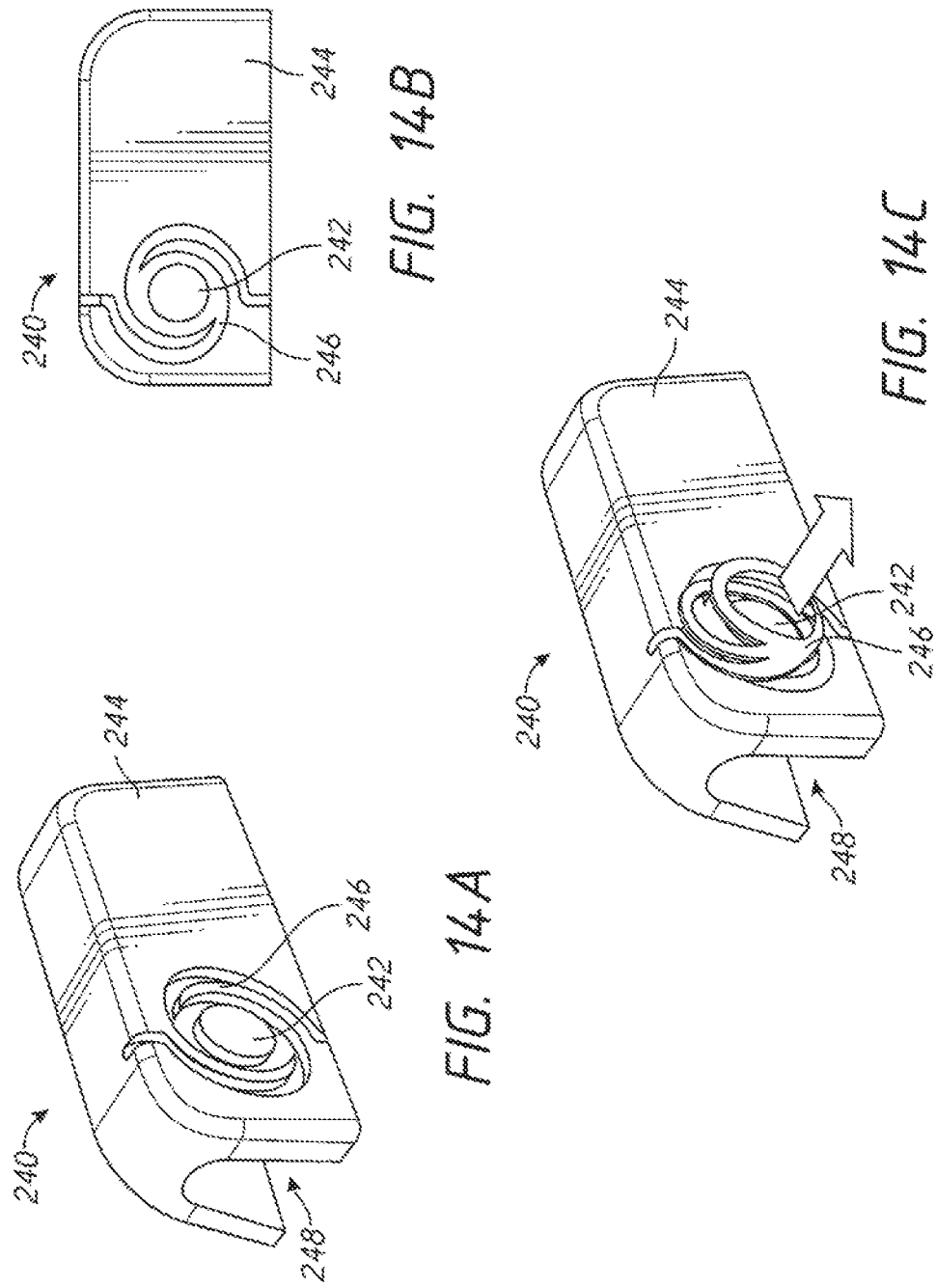

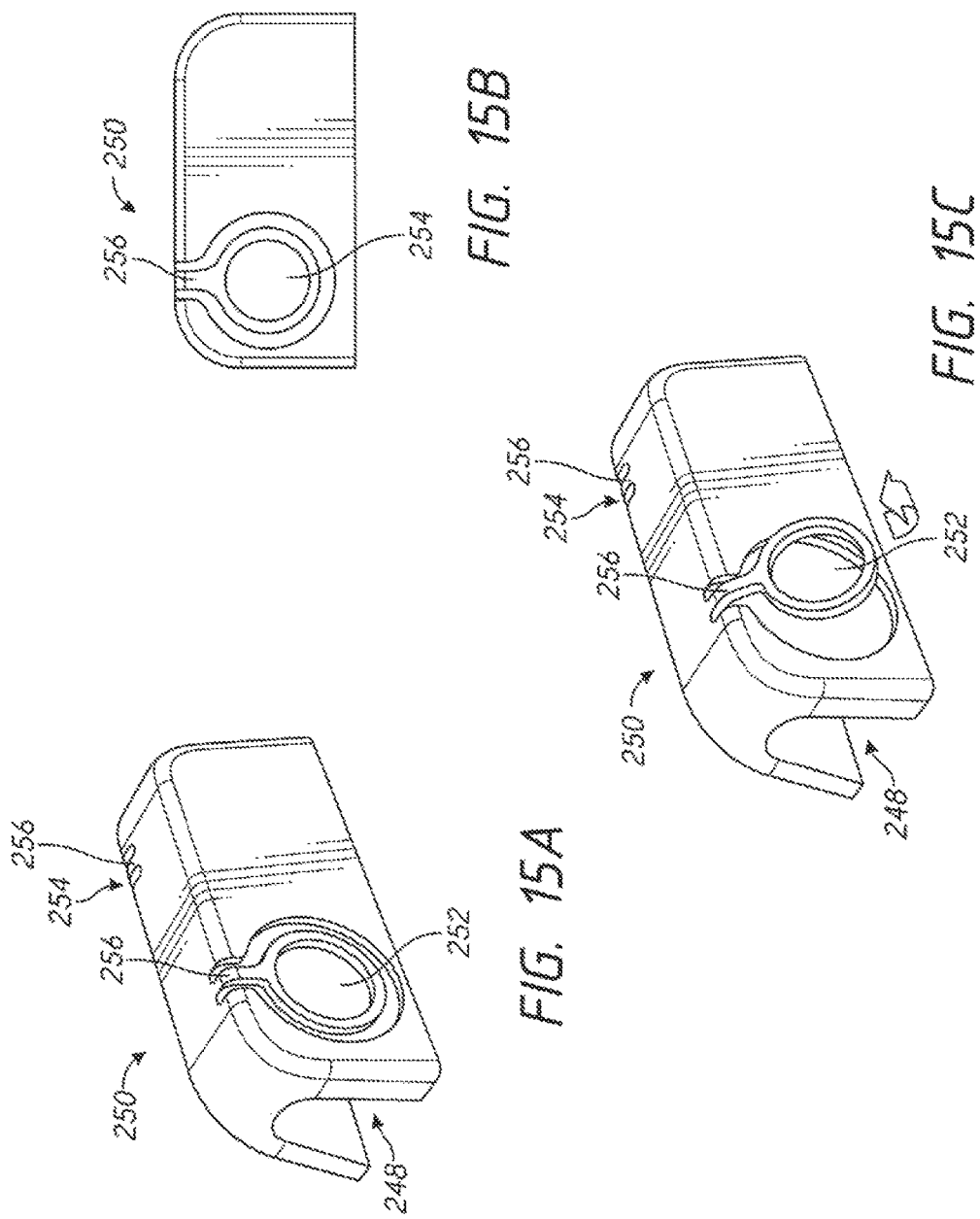

REMOVABLE LENSES FOR MOBILE DEVICES WITH ON-BOARD CAMERA

CROSS REFERENCE TO RELATED APPLICATIONS

This application is a continuation patent application of U.S. patent application Ser. No. 14/676,723 (U.S. Pat. No. 10,088,738), filed on Apr. 1, 2015, entitled "Auxiliary Optical Devices," which claims the priority benefit of U.S. Provisional Patent Application No. 61/978,769, filed on Apr. 11, 2014, entitled "Auxiliary Optical Devices", U.S. Provisional Patent Application No. 61/990,012, filed on May 7, 2014, entitled "Auxiliary Optical Devices", U.S. Provisional Patent Application No. 62/046,817, filed on Sep. 5, 2014, entitled "Auxiliary Optical Devices", U.S. Provisional Patent Application No. 62/048,171, filed on Sep. 9, 2014, entitled "Auxiliary Optical Devices", and U.S. Provisional Patent Application No. 62/061,831, filed on Oct. 9, 2014, entitled "Auxiliary Optical Devices", all of which are incorporated by reference for all purposes herein.

BACKGROUND

This invention relates generally to accessories for communication devices (e.g., mobile telephones, mobile texting devices, electronic pad devices, laptop computers, desktop computers, gaming devices, and/or devices capable of linking electronically to another device or to a network such as the Internet, etc.), and specifically to removable functional components for communication devices.

DESCRIPTION OF THE RELATED ART

In recent years, many advances in computer networking and processing technology have made it possible for communication devices to include cameras that permit users to capture images. In many cases, these images can be stored, processed, and transmitted. However, there are many design constraints on onboard cameras in communication devices that can limit the weight, size, expense, shape, adjustability, and overall quality of the lensing systems of such cameras. Consequently, many cameras in communications devices are inadequate for a wide variety of photographic needs. These deficiencies cannot be addressed by existing modular or detachable lensing systems for use with conventional film or digital cameras due to significant differences between such lensing systems and communication devices, including incompatibilities in attachment structures, weight, optics, size, transportation, storage, ergonomics, and/or portability.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

FIGS. 2A-2B illustrate an example of the auxiliary lens system of FIGS. 1A-1E positioned for attachment on a mobile communication device, and then attached to a mobile communication device.

FIGS. 3A-3C illustrate an example of the auxiliary lens system of FIGS. 1A-1E being removed from the attachment position as shown in FIG. 2B, rotated about a generally vertical axis, and then reattached, so as to switch the positions of the front and rear lenses.

FIGS. 4A-4C illustrate examples of auxiliary lens systems that are adjustable in size to attach to one or more different mobile communication devices.

FIG. 5 illustrates an example of another auxiliary lens system that is adjustable in size to attach to one or more different mobile communication devices.

FIGS. 6A-6D illustrate an example of an auxiliary lens system that is configured to be positioned on a mobile communication device with a surface protrusion.

FIGS. 7A-7C; 8A-8B; 9A-9C; and 10A-10C illustrate examples of auxiliary lens systems that each attach to, or secure or fix into position on, a mobile communication device in whole or in part using a protrusion on a mobile communication device, such as a protruding camera.

FIGS. 12A-12E; 13A-13C; 14A-14C; and 15A-15C illustrate examples of auxiliary lens systems that can be utilized on mobile communication devices that have one or more protruding features, such as a protruding onboard camera.

Figure 1A:
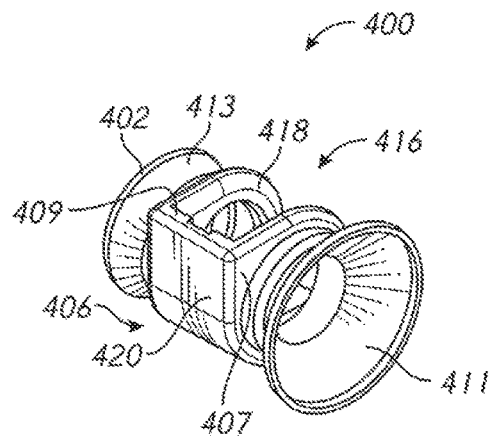
FIGS. 1A-1E illustrate an example of several views of an auxiliary lens system with a plurality of lenses used for different purposes.
Figure 1B:
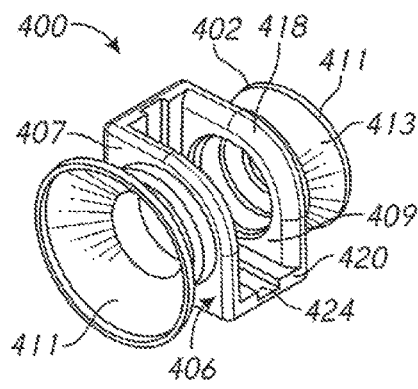
Figure 1C:
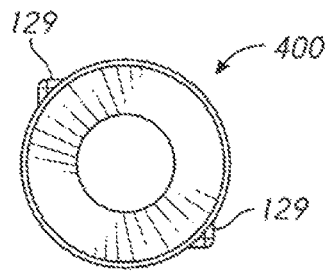
Figure 1D:
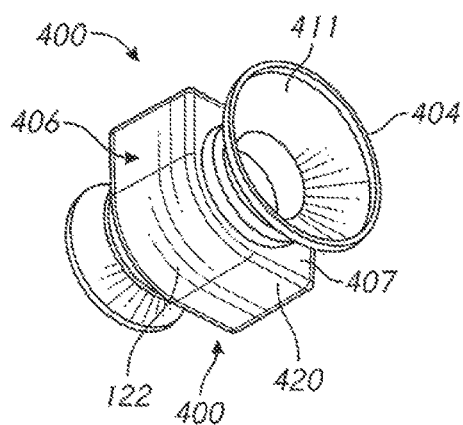
Figure 1E:
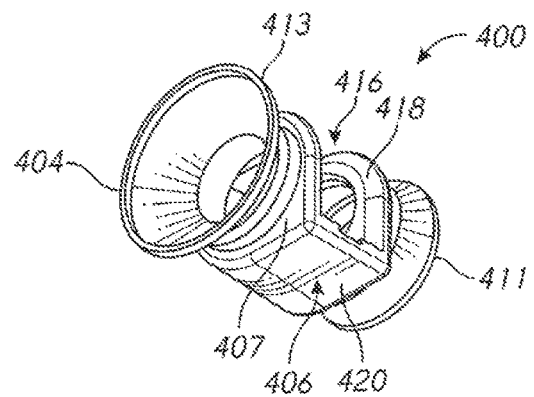

Many other types of communication devices besides those illustrated and described herein can be used, and many different types of components or parts can be used in the auxiliary lens systems, which are encompassed by this specification.

DETAILED DESCRIPTION OF EMBODIMENTS

The following detailed description is now directed to certain specific examples of embodiments of the disclosure. In this description, reference is made to the drawings wherein like parts are designated with like numerals throughout the description and the drawings. The inventions are not limited to the examples expressly illustrated or described in this specification. As used herein, a mobile device refers to a device that can be readily and conveniently carried by a user from one place to another; a mobile electronic device is a mobile device that comprises one or more electronic capabilities; a mobile electronic communication device is a mobile electronic device that comprises one or more communication features that permit the device to communicate with one or more other devices.

Any feature, structure, step, material, or component that is illustrated and/or described in any embodiment in this specification can be used separately from the embodiment in which it is disclosed and/or illustrated, either individually, or in combination with another embodiment described and/or illustrated in this specification, or in combination with any embodiment that is not described and/or illustrated in this specification. For example, without limitation, any embodiment in this specification can include multiple lenses attachable to a single retainer, as illustrated in FIGS. 1A-3C, even if not illustrated or described, and/or any embodiment in this specification can be configured to be attached to a mobile communication device in a first orientation, detached from the communication device, rotated about a generally vertical axis, and reattached to the communication device in a second orientation. No feature, structure, step, material, or component disclosed and/or illustrated in this specification is essential or indispensable.

Referring to FIGS. 1A-3C, an example of a removably attachable auxiliary optical device 400 is illustrated in many different views. In some embodiments, as illustrated, an auxiliary optical device 400 can generally comprise a retainer portion 406 and one or a plurality of lens portions 402, 404. The retainer portion 406 is generally configured to be removably attachable to a mobile electronic communication device such that the one or more optical portions, such as lens portions 402, 404, can be positioned in a region generally covering or near an onboard camera lens in the communication device to enable the one or more lens portions 402, 404 to cooperate optically with the onboard camera, to provide different optical enhancements, improvements, modifications, and/or alternatives, such as one or more of the following: magnification, telephoto, wide angle, fish-eye, polarization, glare reduction, anti-reflection, light filtering or attenuation at particular ranges of wavelengths, and/or coloring, etc. As with all features, structures, steps, materials, or components disclosed and/or illustrated in this specification, any of the foregoing optical features or combinations thereof can be included in any device in this specification. Any of the lenses can be of any suitable shape or configuration, such as plano, spherical, parabolic, cylindrical, toroidal, and/or simple or compound, etc. In some embodiments, as illustrated, the retainer portion 406 is shaped so as to attach to the communication device in a region and in a manner that permits a user to see all or virtually all of a viewing portion (not shown) of the communication device without obstruction or without appreciable obstruction.

One or more of the lens portions 402, 404 can be removably attached to the retainer portion 406 with a securing structure, such as a screw thread, a bayonet mount, a friction fit, a snap fit, a clip, and/or a clasp, etc. One or more of the lens portions 402, 404 can be interchangeable or replaceable with one or more other lens portions with one or more different optical features, such as any of the optical features described elsewhere in this specification.

In some embodiments, the retainer portion 406 can comprise a channel 416 with a plurality of sidewalls or side retaining structures 407, 409. In some embodiments, the retainer portion 406 comprises only a single sidewall or side retaining structure, or no sidewall or side retaining structure. The width of the channel 416, e.g., the distance between the respective sidewalls or side retaining portions 407, 409, can be configured to be generally complimentary to the thickness of a portion of the communication device(s) 134 on which the retainer portion 406 is configured to attach. In some embodiments, the natural width of the channel 416 (e.g., before attachment to a communication device) is approximately the same size or slightly smaller than the thickness of a corner, such as an upper corner, of the outside housing of a communication device near the light aperture of the onboard camera of the communication device. In some embodiments, the natural width of the channel 416 is approximately the same size or slightly smaller than the thickness of another portion of the outside housing, such as an upper central region, or another location.

In some embodiments, as illustrated, one or more of the plurality of walls 407, 409 can have a curvilinear shape along one or more edges to permit the retainer portion 406 to provide increased distance of contact along the edge of the communication device while diminishing the area across a transverse surface of the device that is obstructed by the retainer portion 406. For example, in some embodiments, as illustrated, the curvilinear shape along one or more edges of the walls 407, 409 permits the retainer portion 406 to extend along and attach to at least a portion of two generally converging or generally perpendicular outer edges or sides of a communication device that is approximately as wide as either of the lens portions 402, 404, while diminishing the amount of space on the front of the electronic communication device that is blocked. In the example shown in FIGS. 1A-3C, the curvilinear shape of the edge of the walls 407, 409 can comprise a rounded corner, and avoid or omit a lower pointed or sharp corner that may otherwise extend into and obstruct the viewing portion of the communication device. In some embodiments, the auxiliary optical device 400 does not appreciably block or obstruct the viewing surface of the mobile electronic communication device when attached.

All or part of the retainer portion 406, such as one or more of the plurality of walls 407, 409, can be made of a material (e.g., a polymer or a silicone) that is sufficiently flexible to permit some degree of deformation (e.g., compression, bending, or stretching) of one or more walls 407, 409, so that the channel 416 can be temporarily widened while sliding the auxiliary optical device 400 onto a communication device 134, but at least a portion of one or more of the walls 407, 409 can be sufficiently stiff, rigid, or resilient to urge one or more of the plurality of walls 407, 409 to return to its original position and thereby exert a gripping force against a portion of the communication device, thereby providing a friction fit between the retainer portion 406 and the communication device 134. In some embodiments, a portion (or all) of the material of the retainer portion 406, especially the region on the inner side of the walls 407, 409 within the channel 416, can also be tacky or somewhat slide resistant to enhance the gripping of the retainer portion 406 to the communication device 134. In some embodiments, the gripping force and/or slide resistance can reduce or eliminate the need to attach a permanent or temporary mounting component to the communication device. For example, the lens component 400 can be repeatedly attached to and removed from a communication device 134 without requiring (though not prohibiting) installation on the communication device of a separate permanently or semi-permanently attached mounting component such as a bracket, magnet, adhesive, or other fastening component, thereby providing ease of installation while preserving the original overall shape, appearance, functionality, compatibility (e.g., with other communication devices or cases), and/or feel of the communication device when the lens component is removed.

As with any features, structures, steps, materials, or components disclosed and/or illustrated in this specification, any auxiliary optical device in this specification can be utilized with any type of mobile electronic communication device, including any of those illustrated and/or described in this specification. The mobile electronic communication device 134, as illustrated in FIGS. 2A-3C, includes an onboard camera 132 with a lens that is positioned in a flush or virtually flush relationship with the face of the mobile electronic communication device 134 in which it is embedded.

In some embodiments, the retainer portion 406 can comprise an upper wall 420 that can be shaped in some embodiments to generally correspond to the shape of one or more edges (e.g., side and/or top edges) of a communication device 134. As illustrated, the upper wall 420 has a generally curvilinear shape with a rounded corner 122. The retainer portion 406 can also include one or more internal surface features (e.g., recesses, protrusions, and/or contours, etc.) that are configured to generally avoid interference with one or more external features on a communication device 134. For example, as illustrated, a channel 424 can include a groove to avoid interference or inadvertent contact with a button or other feature on a communication device when the auxiliary optical device 400 is attached to the communication device 134. As illustrated in Figure IC, the sidewalls 407, 409 of the retainer 406 can comprise one or more generally pointed or angular regions 129.

In some embodiments, as illustrated, the retainer portion 406 can be configured to gnp at least two nonparallel sides of a communication device 134. For example, the retainer portion 406 can contact at least a first generally vertical side or edge surface 133 of a communication device and at least a second generally horizontal and generally orthogonal side or edge surface 135 of a mobile communication device 134 (e.g., the lateral side and the top side of the mobile communication device) at the same time during use. In some embodiments, this contact by multiple generally perpendicular edges or surfaces permits repeatable adequately precise placement of the retainer portion 406. In some embodiments, only one edge is contacted or no edges are contacted. In some embodiments, the retainer portion, in any of a variety of configurations, can be attached to a mobile electronic communication device in a single attachment motion, without requiring user adjustment of the location or structure of the retainer portion and/or optical portion during attachment.

In some embodiments, two or more contacting surfaces in the retainer portion 406 can converge at an upper corner having a rounded external surface. In some embodiments, as illustrated, the retainer portion 406 is substantially smaller than the communication device to which it is configured to attach, or even substantially smaller than the viewing portion of the communication device to which it is configured to attach. In some embodiments, a retainer portion can be configured to contact only one side or edge (e.g., the generally vertical or the generally horizontal side or edge), such as by contacting both the front and rear surface of such side of edge but without also requiring contact with another side or edge. An example of such an embodiment can generally be formed from a retainer portion with a general U-shape comprising an upper wall, two side walls, and an opening on each side of the side walls. In some embodiments, a retainer portion can be configured to contact only one surface of the mobile electronic communication device, such as the surface of the mobile electronic communication device on which the onboard camera is located.

In some embodiments, the retainer portion 406 can permit the auxiliary optical device 400 to be removably attached to a communication device without requiring non-stock mounts on the communication device and without requiring dynamic mounts on the retainer portion 112 itself (e.g. fasteners, screws, adjustable clamps, etc.). For example, in some such embodiments, a user can attach the auxiliary optical device 400 to a corner or some other location on a communication device by simply sliding it, for example, onto the corner or other location of the communication device, and can remove it by simply pulling it off, without requiring user adjustment during attachment. In some embodiments, as illustrated, the auxiliary optical device 400 can remain on the communication device 134 by way of a friction fit. The attachment to the communication device can avoid a residue deposit from adhesive, scratches to the exterior surface, or other damage or alteration of the communication device. In some embodiments, the retainer portion can be sufficiently wide and/or long so that it is adapted to receive an end and/or side region (e.g., two or more corners) of a communication device rather than merely one corner, and the other aspects of other embodiments disclosed herein can apply to such embodiments, including but not limited to the shape and materials of construction and the accomplishment of a friction fit between the retainer portion and the end and/or side region of a communication device. In some embodiments, the retainer portion can utilize dynamic mounts and/or any other means for attachment to a mobile electronic communication device. No means of attachment between an auxiliary lens system and a mobile electronic communication device should be deemed to be essential or indispensable to, or excluded by, this specification or any products herein.

The one or more lens portions 402, 404 generally comprises a transparent optical portion or lens 411, which is typically made of a glass or a polymer, and a securing structure 413. The term "lens" and similar terms should be understood in accordance with the customary meaning in this field, and includes at least any optical portion that permits light to pass through and provides some optical characteristic or protection, such as changing light direction, filtering light, and/or modifying one or more qualities of light that passes through the optical portion, etc. The securing structure 413 can be made of many different types of materials or combinations of materials, such as one or more metals (e.g., aluminum or steel) or one or more plastics. The securing structure 413 can include a generally wide-area opening for receiving the optical portion or lens 411 and a generally narrow-area region for attachment to the retainer portion 406. In some embodiments, the securing structure 413 and the retainer portion 406 can be configured to slide or otherwise move with respect to each other in a limited manner to allow for adjustment of the position of the optical portion or lens 402, 404 with respect to the onboard camera lens of a communication device (e.g., for the purpose of addressing manufacturing tolerances in the location of the onboard camera lenses in some communication devices). As illustrated, the mechanism or structure for attachment or securement of the optical portion or lens portion 411 to the retainer portion 406 can be separate from and/or can operate independently of the mechanism or structure for attachment or securement of the retainer portion 406 to the communication device. In some embodiments, as illustrated, the outside surface of the securing structure 413 can taper inwardly from the lens-receiving region to the retainer-attaching region to diminish the amount of material used in manufacturing and to diminish the size and weight of the auxiliary optical device 400. In some embodiments, the auxiliary optical device 400 can be very small, such as less than or equal to about 2½ inches or less than or equal to about 1½ inches across.

In some embodiments, as illustrated in Figures IA-IE, the channel 416 includes an attachment-facilitating surface 418. In the illustrated examples, the attachment-facilitating surface 418 comprises an inwardly curved (e.g., sloped or slanted) surface positioned along the outer edge or slotted opening of the channel 416. In some embodiments, the attachment-facilitating surface 418 can be positioned at or near an outer edge of the channel 416. As illustrated, the attachment-facilitating surface can be thinner near the edge and can gradually become thicker as it progresses further into the channel 416.

As the lens component 400 is moved into an attachment position on a communication device, the attachment-facilitating surface 418 can provide an initial contact region or opening near the outer edge that is effectively wider to facilitate proper orientation and attachment of the device by a user, and a narrower second region further within the channel 416 (or further from the edge of the lens component 400), thereby providing a more secure attachment surface as the auxiliary optical device 400 is moved further onto the attachment region of the communication device 134. In some embodiments, as illustrated, the width of the channel 416 can change between the initial contact region and the second region in a smooth, gradual, and/or curvilinear manner. Some embodiments can include many other types of shapes. For example, the attachment-facilitating surface 418 can include a discontinuous surface or a series of discrete ramps, protrusions, or grooves. As with any other features, structures, steps, methods, or components illustrated and/or described in this specification, the attachment-facilitating surface 418 can be included on any embodiment of an auxiliary optical device.

As illustrated in FIGS. 2A and 3C, the user can select which of the plurality of lenses 402, 404 to position in front of the camera 132 of the communication device 134 to achieve a desired photographic affect. In FIG. 2B, the lens component 400 is moved into an attachment position on a communication device 134 such that a first (e.g., smaller-diameter) lens 402 is positioned in front of the onboard camera lens 132 and a second (e.g., larger-diameter) lens 404 is positioned on an opposite side of the communication device 134. In this orientation, the smaller-diameter lens 402 is operative and the larger-diameter lens 404 is not operative. In FIGS. 3A-3C, the lens component 400 is removed from the communication device, rotated about a vertical axis (e.g., approximately 180° in this example), and rotated about a horizontal axis to orient the channel 416 in general alignment with an attachment surface (e.g., a housing edge) of the communication device. In FIG. 3C, the auxiliary optical device 400 is again advanced onto the communication device 134 such that the second optical component (e.g., the larger-diameter lens 404) is positioned in front of the onboard camera lens 132 and the first optical component (e.g., the smaller-diameter lens 402) is positioned on an opposite side of the communication device 134. In this orientation, the larger-diameter lens 404 is operative and the smaller-diameter lens 402 is not operative. In some embodiments, this configuration of a lens component 400 can conveniently permit multiple lens options without necessarily requiring the user to hold or store multiple discreet lens components. In some embodiments, more than two lens types or features can be included in the lens component 400, thereby providing the user with many lens options.

In the illustrated examples, though not in every embodiment, the first and second optical components 402, 404 are not in optical communication with each other, and only one of the optical components 402, 404 is in optical communication with a particular onboard camera 132 at the same time. The particular optical component 402 or 404 that is in optical communication with the onboard camera 132 is configured to receive light that is impinging upon the surface of the mobile electronic device in which the onboard camera 132 that in optical communication with the optical component 402 or 404 is located.

Any of the foregoing features, steps, structures, methods, or components, and/or anything else disclosed and/or illustrated in U.S. Pat. No. 8,279,544, which is incorporated herein by reference in its entirely for all that it discloses, can be used with or instead of any features, steps, structures, methods, or components disclosed and/or illustrated elsewhere in this specification. For example, any retainer portion disclosed below in this specification can be configured to attach to any optical component or lens described and/or illustrated above, and/or any feature of any retainer portion disclosed below in this specification can be combined with any retainer portion 400 (or any feature thereof) that is described and/or illustrated above, and/or any method of attaching a retainer portion to a mobile electronic communication device (or any step thereof) described and/or illustrated above can be used in any of the embodiments described and/or illustrated below, etc. Any other combinations of features can be used.

Figures 4A, 4B:
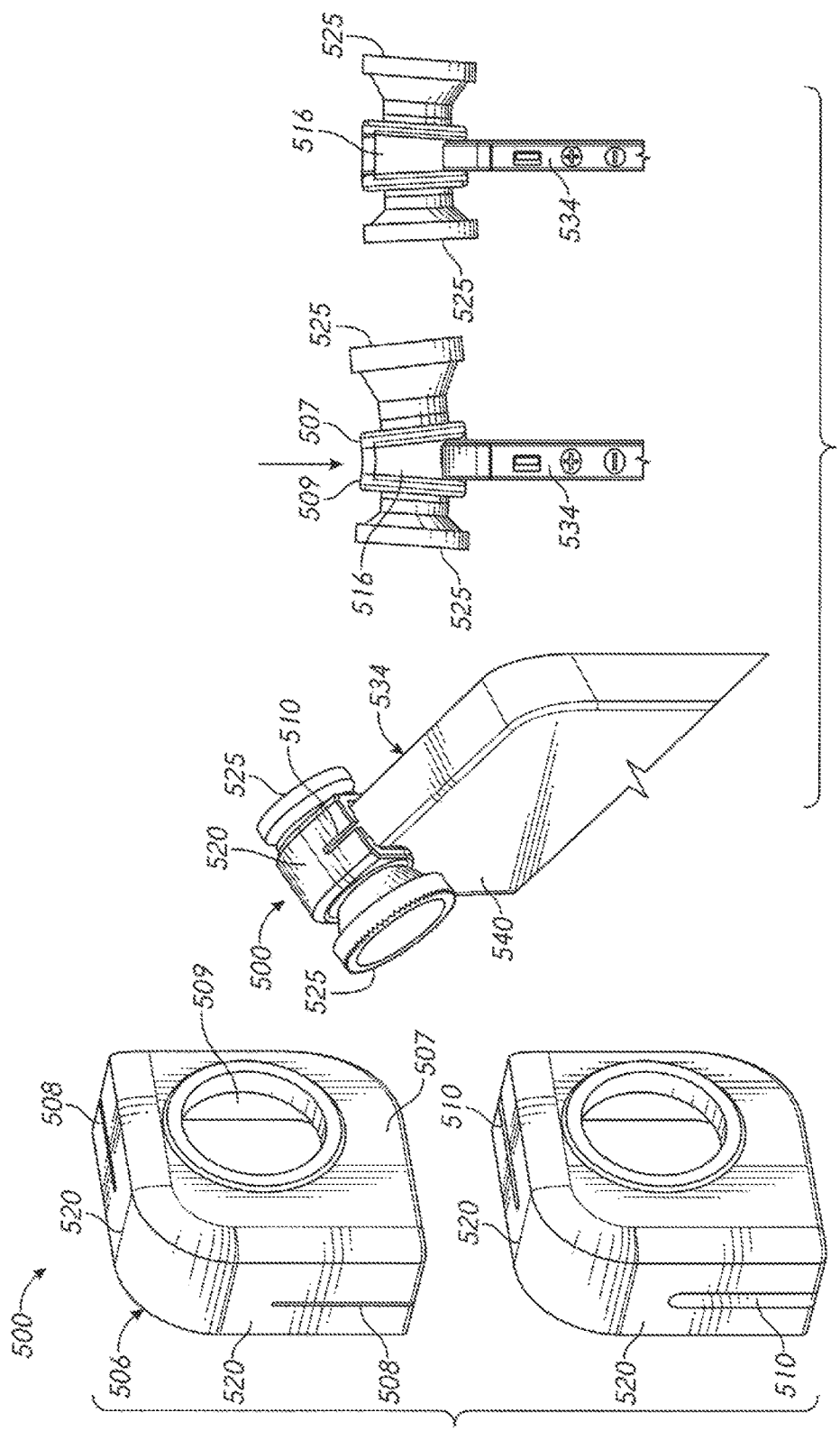

As illustrated in FIGS. 4A-4C, in some embodiments, an auxiliary lens system 500 can adjust or be adjustable to attach to one or more mobile communication devices. In some embodiments, the adjustment can permit a single auxiliary lens system to fit onto a plurality of different types or models of mobile electronic communication devices with different sizes or shapes, or to fit onto a mobile electronic communication device whether or not it is enclosed within a case, or is attached to some other type of other auxiliary accessory or component, that effectively changes the size or shape of the mobile electronic communication device. In some embodiments, the adjustment can permit the auxiliary lens system 500 to be attached to a mobile communication device that has a non-planar surface, such as a surface with an embedded onboard camera that extends above the surface.

As shown in FIG. 5, an adjustable auxiliary lens system 500 can comprise a retainer portion 506. As illustrated, the retainer portion 506 can comprise a first wall 507, a second wall 509, a top wall 520, and a channel 516 between the first and second walls 507, 509. As used throughout this specification, it is contemplated that any wall (such as the first wall 507, second wall 509, and/or the top wall 520, and in other embodiments) can be replaced by, in whole or in part, another connection or support structure, such as a connector, a bar, an attachment, a strut, etc. The top wall 520 can be attached to both the first wall 507 and the second wall 509, as illustrated. The space between the first wall 507 and the second wall 509, as well as the corresponding width of the top wall 520, can be configured to generally correspond to the size of a portion of a mobile electronic communication device that is intended to be inserted into the channel 516 for retaining the retainer portion 506 on the mobile electronic communication device 534, 536. Any of the walls 507, 509, 520 can include openings, as illustrated.

In some embodiments, the auxiliary lens system 500 is configured to be adjustable by providing a variable-width top wall 520 and/or by providing a variable angle between at least a portion of the first and second sidewalls 507, 509, such that the first and second sidewalls 507, 509 can be moved away from a parallel relationship with each other. Many different structures and methods can be employed to accomplish any of such variations. For example, as shown, one or more adjusters 508, 510 can be provided in a portion of the retainer 506. In the illustrated example, the adjusters are slits. In some embodiments, at least one slit 508, 510 is provided in a top or side portion of the top wall 520. The width of the slit 508, 510 can be small or large depending on how much flexibility is desired. For example, in some embodiments, a narrow slit 508 can provide a low degree of flexibility and a wide slit 510 can provide a high degree of flexibility. In some embodiments, the amount of flexibility of the retainer portion 506 can depend, in whole or in part, on the material of which the retainer portion 506 is made. For example, a low durometer material, such as silicone, can provide a high degree of flexibility, while a high durometer material, such as a rigid plastic or metal (e.g., aluminum), can provide a lower degree of flexibility.

As illustrated, a plurality of adjusters 508, 510 can be provided in an orientation such that a first generally horizontal adjuster 508 is positioned generally orthogonally to a second generally vertical adjuster 508 to permit adjustment of the width of the channel 516 in at least two dimensions, such as in a generally horizontal plane and in a generally vertical plane. In some embodiments, an auxiliary optical device 500 with one or more adjusters can be configured to fit onto one or more different types of mobile electronic communication devices, such as a pad or tablet device 538 (such as the iPad device made by Apple, Inc.), a mobile telephone device 534 (such as the iPhone device made by Apple, Inc.), and/or a mobile storage device (such as the iPod Touch device made by Apple, Inc.).

In some embodiments, using one or more adjusters, the retainer portion 506 can be permitted to move from at least a first, relaxed position in which the first and second walls 507, 509 are generally parallel to each other, to a second, stressed position, in which the first and second walls 507, 509 are not generally parallel to each other, such that a first side of the channel 516 (e.g., a side near the opening of the channel 516) can be larger than a second side of the channel 516 (e.g., a side near the top wall 520 of the channel 516). In some embodiments, in the second position, the retainer 506 exerts a restoring force, urging the retainer 506 back toward the first position, which can cause one or more of the sidewalls 507, 509 to press against a portion of a mobile electronic communication device to which the retainer 506 is attached, thereby more securely holding the retainer 506 onto the mobile device. In some embodiments, the first and second walls 507, 509 are generally parallel to each other in both the first and second positions but the retain portion flexes or stretches or expands internally to help position a retainer portion on a mobile communication device with a protruding feature and/or to help retain a retainer portion on a mobile communication device, such as by exerting an inwardly directed biasing force against the mobile communication device, on one or more sides or faces of the mobile communication device.

As illustrated, the auxiliary optical device 500 can comprise one or more optical portions 525 that comprise one or more lenses which can be removably or permanently attached to the retainer portion 506 such that at least one optical portion 525 is configured to be positioned in optical communication with an onboard camera 542 on a first side 540 of a mobile electronic communication device 534, 538 when the retainer portion 506 is attached to the communication device. The one or more optical portions 525 can be attached as described elsewhere in this specification.

In some embodiments, the adjusters 508, 510 can be located in one or more different locations on the retainer 506 than as illustrated in FIGS. 4A-4C, and/or the adjusters can be configured or structured in many different ways. For example, in some embodiments, one or more adjusters can be provided as one or more adjustable resilient members, such as flexible or stretchable struts or springs, and/or one or more telescoping connectors.

For example, as illustrated in FIG. 5, an adjuster can comprise a resilient portion 514, such as a resilient band or strip that extends along the length of the top wall 520 from a first end to a second end, in some embodiments. The resilient adjuster 514 can comprise adjuster sections, such as a top adjuster section 508, a corner adjuster section 512, and a side adjuster section 510. In some embodiments, as illustrated, the adjuster sections 508, 510, 512 merge into each other at their ends, such that there is no space between them, and in some embodiments there is space between one or more adjuster sections 508, 510, 512. In some embodiments, the resilient adjuster is located in a corner only. As with all structures, steps, methods, or components disclosed in this specification, any aspects of the one or more adjusters 508, 510, 512, 514 can be included in any embodiment in this specification. For example, a resilient adjuster of the type illustrated in FIG. 5 can be included (e.g., on a corner portion) in a retainer portion with one or more slit adjusters 508, 510 of the type illustrated in FIGS. 4A-4C.

As illustrated in FIGS. 6A-6D, in some embodiments, an auxiliary optical device 600 can be configured to attach to a mobile electronic communication device 634 with a non-planar surface 610, such as a surface 610 in which an onboard camera 632 extends above and/or beyond and/or protrudes outwardly from one or more other portions of the surface 610, as illustrated. In some mobile electronic communication devices 634, such as some versions of the iPod Touch device made by Apple, Inc., the thickness of the onboard camera is greater than the thickness of the available interior space for the camera inside of the mobile electronic device, so a portion of the onboard camera extends outside of the mobile electronic device, such as by about 1 or 2 millimeters. In some embodiments, a protective structure 636 extends partially or entirely around a lens 638 of the onboard camera 632 to help protect the lens 638 from being cracked, broken, or otherwise damaged. The protective structure 636 can be in many different forms, such as a circular ring, as illustrated, or any other type of protective structure. As illustrated in FIGS. 6A-6D, in some embodiments, the onboard camera (including the ring in some embodiments) does not include attachment structure, such as bayonet mounts, screw threads, grooves, clips, and/or other structure, but instead can have a smooth, homogeneous, uniform, continuous, round outer surface around its periphery. For example, as shown in FIGS. 6A-6D, the onboard camera does not include radially extending protrusion or recesses. By omitting attachment structure, as illustrated in FIGS. 6A-6D, the mobile electronic communication device 634 presents an overall stream-lined and aesthetically pleasing design, which also is less likely to snag or catch on other objects, such as items within a pocket where the mobile device 634 is stored or on a protective case for the mobile device 634. In other embodiments, the mobile electronic communication device 634 may include one or more attachment structures on or generally surrounding the onboard camera, such as one or more bayonet mounts, screw threads, clips, and/or ferromagnetic material, and any device illustrated and/or described anywhere in this specification can be utilized with such a mobile electronic communication device 634, with appropriate modifications to the fit, attachment, and spacing, as needed.

In some embodiments, a portion of the retainer 606 of the auxiliary optical device 600 can comprise a receiving structure configured to receive the protruding portion of the onboard camera 632, including the protective structure 636 of the onboard camera 632, when the retainer 606 is attached to a mobile communication device 634. The retainer 606 can comprise first and second walls 607, 609, a top wall 620, and an interior groove positioned between the first and second walls 607, 609. In some embodiments, the retainer 606 is substantially rigid so as to resist bending or twisting to a degree that might otherwise produce inconsistent or imprecise optical effects. The retainer 606 can be configured to removably attach to the mobile device 634 by way of a friction fit, as in some other embodiments disclosed elsewhere in this specification. As illustrated, in some embodiments, the receiving structure can comprise one or more channels 615 in one or more first and second walls 607, 609, within the groove 616, or in other supporting structure of the auxiliary optical device 600. The one or more channels 615 can be sized and shaped so as to be configured to receive, in a clearance fit or in a contacting, friction fit (as shown), at least a portion of an outer perimeter or circumference 636 of the protruding onboard camera 632. A contacting or friction fit between the protruding onboard camera 632 and the channel 615 can help to retain the retainer 606 on the mobile communication device 634, as illustrated. In some embodiments, the width across the channel 615 is about the same size as the outer diameter or cross-sectional width of the onboard camera 632, and the length of the channel 615 within either or both of the walls 607, 609 of the retainer 606 is equivalent to or about the same as the distance travelled by the leading edge of the retainer 606, beginning from the point when it first contacts or overlaps with the onboard camera to its stopping point after the retainer 606 is fully attached to the mobile communication device 634. In some embodiments, the one or more channels 615 may be slightly wider than the protruding onboard camera 632, such that the one or more channels 615 do not help to attach the auxiliary optical device 600 to the mobile device 634, but rather merely provide clearance for the onboard camera 632 during attachment of the auxiliary optical device 600 to the mobile device 634. As illustrated in FIGS. 6B and 6D, at least a portion of the first or second wall can be configured to contact the front face of the mobile electronic communication device in a region adjacent to the protruding ring when the auxiliary optical device 600 is attached to the mobile electronic communication device.

In some embodiments, as illustrated, the channel 615 can comprise a generally smooth, generally continuous, rounded internal end region 617 that is shaped, sized, and/or contoured to correspond to at least a portion of the protruding surface of the onboard camera 632 that is configured to snuggly or tightly abut against the end region 617 when the retainer 606 is fully attached to the mobile electronic device 634 to help secure the retainer 606 in position. For example, as illustrated, the end region 617 can form a portion of an arc or some other shape that corresponds to or matches or is the same as a portion of an arc or some other shape formed by an upper region of the outer surface of the protruding onboard camera 632. In some embodiments, as shown, simultaneous contact in two or more regions between the mobile device 634 and the retainer 606 can provide a secure connection or registration of the retainer 606 to the mobile device 634 during use, such as to avoid misaligning the optical axis of the onboard camera 632 and the central axis of the lens 638, and/or to avoid shifting or blurring of an image. For example, the retainer 606 can be structured or configured to provide: (a) simultaneous contact between the end region 617, or some other internal or external abutting or securing region of the retainer, and a portion of the protruding onboard camera 632 (e.g., a top portion and/or a left side portion and/or a right side portion of the protruding onboard camera 632); and/or (b) either or both of the following: (i) simultaneous contact between a top edge of the mobile device 634 and a top portion of the retainer 606; or (ii) simultaneous contact between a side edge of the mobile device 634 and a side portion of the retainer 606. In some embodiments that include one or more channels 615, the depth of the one or more channels 615 can generally correspond to or be slightly greater than the distance between the surface 610 of the mobile communication device 634 in which the onboard camera 632 is embedded and the outermost protruding surface of the onboard camera 632 itself, such as at least about 1 or 2 millimeters. In some embodiments (not shown), the receiving structure can comprise an insertion pathway formed by one or more protruding bands and/or posts, which can guide the protruding onboard camera 632 into the interior of the retainer 606, rather than a recessed pathway within the wall of the retainer 606, as illustrated.

The receiving structure (e.g., channel 615) can be oriented in a variety of different ways, depending upon how the auxiliary optical device 600 is intended to be used and/or attached. In some embodiments, as illustrated, the receiving structure can be oriented at an oblique angle, such as at about 45 degrees with respect to the sidewalls, as illustrated, permitting the retainer 606 to be attached to a mobile communication device in a generally diagonal manner. Many other orientations can be used, such as generally vertical or generally horizontal, permitting the retainer 606 to be attached to a mobile communication device 634 in a generally downward vertical direction or in a generally horizontal direction, respectively. In some embodiments, multiple channels 615 can be provided in different orientations to permit a plurality of different attachment pathways, depending on a user's preference. In some embodiments, a channel (not shown) does not constitute an impression or recess in an otherwise generally uniformly planar surface, as illustrated, but rather the channel comprises a continuous or segmented guide way or one or more or a series of protrusions or bumps that are configured to receive and to guide the protruding onboard camera into position when the retainer 606 is attached to a mobile electronic communication device 634.

In some embodiments, a plurality of receiving structures can be provided, such as a separate receiving structure in different opposing interior walls 607, 609 of the retainer 606, as illustrated, to enable the retainer to be flipped around or rotated to selectively position a particular optical component with a desired optical enhancement in optical communication with the onboard camera 632. Any other features, steps, structures, methods, or components illustrated in any other embodiments of this specification can be used with or instead of those in the embodiment of FIGS. 6A-6D. For example, without limitation, any optical component or lens structure described elsewhere in this application can be used with the retainer 606 illustrated and/or described in connection with FIGS. 6A-6D. In some embodiments, either or both of the second wall 609 and/or top wall 620 can be omitted (along with the groove 616), since the attachment between the receiving structure and the onboard camera 632 by itself can be sufficiently secure in some embodiments to render unnecessary any additional attachment structures. In some embodiments, not illustrated, the front wall 607 can be very small, comprising essentially just a base of the lens portion. In any embodiment disclosed and/or illustrated in this specification, any retainer portion or any similar attachment structure for an auxiliary optical device can comprise ferromagnetic material, adhesive, bayonet mounts, or one or more other attachment features to help removably secure an optical component such as a lens to a corresponding mobile communication device.

FIGS. 7A-7B illustrates another embodiment of an auxiliary optical device 700 that can be configured to attach to a mobile electronic communication device 634 with a non-planar surface 610, such as a first surface 610 in which an onboard camera 632 extends above the surface 610, as illustrated. The auxiliary optical device 700 can comprise a receiving and/or a retaining structure that is configured to permit a surface disuniformity, such as a protruding onboard camera 632, to pass into, through, and/or around the auxiliary optical device 700, and/or to permit the auxiliary optical device 700 to be removably secured or attached to the mobile electronic communication device 634, in whole or in part, using a connection between the onboard camera 632 and the auxiliary optical device 700.

FIG. 7B illustrates a vertical cross-section of the auxiliary optical device 700 of FIG. 7A, along the line 7B-7B. As shown in FIG. 7B, in some embodiments, the receiving and/or retaining structure can comprise a pathway or channel that is configured to permit a surface disuniformity, such as a protruding onboard camera 632, to pass into and be secured by the auxiliary optical device 700. The pathway or channel can comprise a constricted passage 710 with a side-to-side width between first and second lateral walls 780, 790 that is less than the diameter of the onboard camera 632 (e.g., including the protective structure 636 in some embodiments) of the mobile communication device 634. In some embodiments, the first and/or second walls 712, 714 of the constricted passage 710 can be formed from a resilient or flexible material, such as a silicone or a soft, low-durometer polymer plastic, which can compress, or flex, and/or move laterally, or in one or more other directions, as the auxiliary optical device 700 is slid or otherwise moved into position on a mobile electronic device 634, as shown in FIG. 7A In some embodiments, the constricted passage 710 can be made from a rigid material that moves rather than flexing, compressing, and/or bending. The constricted passage 710 can be formed, at least in part, by one or more movable portions that slide, pivot, shift, or otherwise move to permit entry of the protruding onboard camera as the auxiliary optical device 700 is moved into position on the mobile electronic communication device 634.

In some embodiments, as shown, the constricted passage 710 can lead into or be in communication with a seating region 716 that has a cross-sectional width or diameter that is substantially larger than the width of the constricted passage 710, such as for example at least about twice as large or at least about 1.5 times as large. As shown, the cross-sectional width or diameter of the seating region 716 can generally correspond to the cross-sectional width or diameter of the protruding onboard camera 632. For example, the cross-sectional width or diameter of the seating region 716 can be about the same size as, or slightly smaller than (e.g., less than or equal to about 1 millimeter smaller), or slightly larger than (e.g., less than or equal to about 1 millimeter larger), the cross-sectional width or diameter of the protruding onboard camera 632. The seating region 716, as shown, can be round or circular. In some embodiments, as illustrated, the shape, size, and/or contouring of the seating region 716 can be approximately the same as or can correspond to the shape, size, and/or contouring of the protruding portion of the onboard camera 632. The material surrounding all or a portion of the seating region 716 can be flexible or resilient. In some embodiments, the seating region 716 can be configured to provide a clearance fit, a friction fit, a tight fit, and/or a snug fit with the protruding onboard camera 632, to help hold or retain the auxiliary optical device 700 in position and/or to securely fix or maintain a particular position or orientation of the auxiliary optical device 700. As illustrated, in some embodiments, the walls of the constricted passage 710 and the seating region 716 can be made of the same material in a unitary or integral structure.

In use, the auxiliary optical device 700 can be brought by a user into close proximity with a region of a mobile communication device 634 near an onboard camera 634, such as a corner region or an upper central region of the mobile communication device 634. A first wall 718 of the auxiliary optical device 700 can be configured to slide onto or overlap the first surface 610 of the mobile communication device 634 until an optical region or lens (not shown) attached to the first wall 718 is positioned adjacent to and/or in optical communication with the onboard camera 632 of the mobile communication device 634. Any type of optical region or lens can be used, including but not limited to any optical region or lens described and/or illustrated elsewhere in this specification, as with all other features, steps, structures, methods, and components disclosed herein. A plurality of optical regions or lenses with different optical characteristics that are selectively or removably attachable to the auxiliary optical device 700 can be provided.

As the auxiliary optical device 700 is brought into position on the mobile communication device 634, the onboard camera 634 initially comes into contact with a leading opening of the constricted passage 710 (e.g., on the lower edge of the constricted passage 710). At this point, in some embodiments, the force exerted by the user to position the auxiliary optical device 700 on the communication device 634 increases, as the constricted passage 710 provides a degree of resistance to entry of the onboard camera 634. This increased force can urge the constricted passage 710 to enlarge or open to permit passage of the onboard camera 634 into and through the constricted passage 710. As the user continues to push on the auxiliary optical device 700, such as on an upper wall 719 and/or sidewall 720 (if either of such walls is included), the onboard camera 634 advances from the constricted passage 710 into the seating region 716. When the auxiliary optical device 700 has been pushed until the onboard camera 634 is positioned in the seating region 716, and one or more internal walls 722, 724 (if included) of the auxiliary optical device 700 contact or abut against then the constricted passage 710, the constricted passage 710 can rebound or otherwise move back into its original constricted shape or position.

In some embodiments, as shown, the constricted passage 710 can prevent the onboard camera 634 from leaving the secured position in the seating region 716 unless and until the user applies a force that is sufficient to overcome the resistance of the constricted passage 710 in opposition to opening or moving, such that the user-applied force permits the onboard camera 632 to enter and to return back through the constricted passage 710 and to ultimately emerge out of the auxiliary optical device 700. In some embodiments, as illustrated in FIGS. 7A-7C, the auxiliary optical device 700 is configured to be attachable to and detachable from a mobile communication device in a single motion by the user, with a passive restraining system, without requiring the user to adjust or control any other actuators, attachments, clips, screws, and/or levers, etc., in order to secure or to remove the auxiliary optical device 700.

In some embodiments, as illustrated in an example in FIG. 7C, an auxiliary optical device 700a can include a front or first wall 718 but not a top wall, or not a lateral wall, and/or not a rear side wall, since the retaining pressure of the seating region 716, which can be configured to be in direct contact with the onboard camera 632 along all, a majority of, or part of, the circumference or perimeter of the onboard camera 632, can be sufficient to attach and/or secured in position the auxiliary optical device 700a on the mobile electronic communication device 634. In some embodiments, as illustrated in FIG. 7C, one of more edges 730, 740 of the retainer portion 770 of the auxiliary optical device 700a are not required to contact one or more edges 750, 760, 770 of the mobile communication device 634 in order to secure or position the auxiliary optical device 700a in place; however, in some embodiments, as illustrated in FIG. 7A, one or more edges 719, 720 of the retainer portion of the auxiliary optical device 700 can contact one or more edges 750, 760, 770 of the mobile communication device 634 to help secure or position the auxiliary optical device 700a in place.

FIGS. 8A-8B and 9A-9C provide examples of securing structures that can be active in some embodiments, passive in some embodiments, and partially active and partially passive in some embodiments. For example, FIGS. 8A-8B illustrate an example of an auxiliary optical device 800 that is similar or identical in many respects to the auxiliary optical devices 700 and 700a of FIGS. 7A-7C. As with any features, steps, structures, methods, or components illustrated and/or described in this application, everything disclosed in connection with FIGS. 7A-7C can be used with or instead of anything disclosed in connection with FIGS. 8A-8B and 9A-9C. FIG. 8B is a cross-section of the auxiliary optical device 800 along line 8B-8B in FIG. 8A.

As shown in FIGS. 8A and 8B, the auxiliary optical device 800 can comprise a retainer portion 816 with a receiving and/or a retaining structure that is configured to permit a surface disuniformity on a first face 806 of the mobile communication device 634, such as a protruding onboard camera 632, to pass into, through, and/or around the auxiliary optical device 800, and/or to permit the auxiliary optical device 800 to be removably secured or attached to the mobile electronic communication device 634, in whole or in part, using a connection between the onboard camera 632 and the auxiliary optical device 800. The auxiliary optical device 800 can comprise an internal region 828 with an internal passageway 810 that is sufficiently wide to accommodate and/or receive a protruding onboard camera 632. In some embodiments, the internal passageway 810 has a generally or substantially constant width from an entry opening to a seating region 825. As illustrated, the width of the internal passageway 810 can generally correspond to the diameter or cross-sectional width of the protruding onboard camera 632, to permit the onboard camera 632 to pass into and through the passageway 810. The seating region 825 can be sized and/or shaped to generally conform to the size and/or shape of at least a portion of the onboard camera 632, such as an upper portion or upper arc of the onboard camera 632.

The auxiliary optical device 800 can comprise a first wall or face 802 on which an optical component or lens (not shown) can be configured to permanently or removably attach. The auxiliary optical device 800 can comprise one or more other walls, as illustrated and/or described in one or more other embodiments herein. A top wall 804 of the auxiliary optical device 800 can extend between the first wall 802 and a second or rear wall (not shown) on an opposing side of the mobile communication device 634. In some embodiments, as shown, the top wall 804 can be configured to contact or be near a top edge 808 and/or a side edge 818 of the mobile communication device 634 when the auxiliary optical device 800 is attached to the mobile communication device 634. One or more interior edges 812, 814 of the auxiliary optical device 800 can be configured to abut against top and/or side edges 808, 818, respectively, of the mobile communication device 834.

The auxiliary optical device 800 can comprise a restraining member 850 that is configured to help secure, retain, and/or affix the auxiliary optical device 800 in position on a mobile electronic communication device 634. In the example illustrated in FIGS. 8A and 8B, the restraining member 850 is a moveable member. In some embodiments, as shown, a movable restraining member 850 can pivot around a pivot point 852. In some embodiments, a movable restraining member can move in other ways, such as sliding, shifting, contracting, or otherwise moving. In the illustrated example, the restraining member 850 can initially be pivoted or otherwise moved so as to be outside of the passageway 810 or so as not to block entry into the passageway 810, providing a first or open position of the auxiliary optical device 800. After the protruding onboard camera 632 is passed into the passageway and reaches or contacts or abuts against the seating region 825, the restraining member 850 can be configured to move (e.g., pivot) into a position behind or below or in contact with a lower region of the protruding onboard camera 632 that is generally opposite from the upper region of the protruding onboard camera 632 that is positioned in the seating region 825, providing a second or closed position of the auxiliary optical device 800.

In some embodiments, the transition from the first or open position of the auxiliary optical device 800 to the second or closed position of the auxiliary optical device 800 can be accomplished passively. For example, in some embodiments, a restraining member that is substantially shorter in length than the restraining member 850 illustrated in FIGS. 8A and 8B can be configured to be temporarily pivoted out of the way of the protruding onboard camera 632, while the auxiliary optical device is moved into position on the mobile communication device 634, and then made to resiliently return to the original blocking position as shown, thereby temporarily impeding or resisting the exit of the protruding onboard camera 632 from the auxiliary optical device 800 until the user applies a removal force that is sufficiently great to permit the restraining member 850 to pivot outwardly and release the protruding onboard camera 632 from the internal passageway 810. The restraining member 850 can be passively biased toward an initial position, as illustrated, such as by a coil spring or resilient band or some other biasing member. Many other types of passive transitions are also possible and are encompassed by this specification.

In some embodiments, the transition from the first or open position of the auxiliary optical device 800 to the second or closed position of the auxiliary optical device 800 can be accomplished actively. For example, in some embodiments, the restraining member 850 can be functionally connected to a user-operable actuator, such as a knob, lever, switch, and/or handle, etc., to permit manual movement (e.g., turning, rotating, and/or sliding, etc.) of the restraining member 850 from the closed position, as shown, to a temporary open position while the protruding camera is positioned within the internal passageway 810. In some embodiments, the transition from the first or open position of the auxiliary optical device 800 to the second or closed position of the auxiliary optical device 800 can be accomplished in a partially active and partially passive way. For example, in some embodiments, the restraining member 850 can be functionally connected to a user-operable actuator and can also be biased toward a return position. In this way, the auxiliary optical device 800 can be secured or affixed to the mobile communication device 634 passively, while requiring active user actuation to release the auxiliary optical device 800; or the auxiliary optical device 800 can require active user actuation to secure or affix the auxiliary optical device 800 to the mobile communication device 634, while permitting the auxiliary optical device 800 to be released from the mobile communication device 634 passively, such as merely by applying a force by the user on an outside surface of the auxiliary optical device 800.

FIGS. 9A-9C illustrate another embodiment of an auxiliary optical device 900, with active or partially active securing and/or releasing. The auxiliary optical device 900 of these figures can include any of the features, steps, structure, methods, or components disclosed and/or illustrated elsewhere in this specification, including any disclosed and/or illustrated in connection with FIGS. 8A-8C. In any embodiments in this specification, such as in some versions of the embodiment of FIGS. 9A-9C, a first securing mechanism can provide a securing function on the protruding onboard camera 632, in addition to a second securing mechanism provided by one or more of the walls 902, 904 (and/or a rear wall, not shown) of the retainer 900 in a friction fit, or some other mode of attachment, with one or more of the outer surfaces of the mobile electronic communication device 634. FIG. 9B is a cross-section of the auxiliary optical device 900 along line 9B-9B in FIG. 9A.

The auxiliary optical device 900 can comprise a retainer portion 916 that can include any of the features or attributes of any of the other retainer portions and/or retainers disclosed and/or illustrated elsewhere in other embodiments in this specification. The auxiliary optical device 900 can comprise an inner cavity that comprises one or more of: a first upper wall 906, a second side wall 908, and/or an internal passageway 910. Either or both of the first and second walls 906, 908 can be configured to contact, abut against and/or be positioned adjacent to one or more upper and/or side edges of a mobile device 934. The internal passageway 910 can include any of the features or attributes of the internal passageway 810 of FIGS. 8A-8B, or the channel 615 of FIG. 6B, or the constricted passage 710 of FIGS. 7A-7C, and/or any similar or complimentary structure in any embodiment in this specification. The passageway 910 can comprise first and second lateral walls 912, 914 that are sufficiently spaced apart from each other to permit passage of the protruding onboard camera 632 that is disposed or embedded in a first surface 918 of the mobile communication device 634.

As with other embodiments disclosed and/or illustrated in this specification, when the retainer portion 916 is moved into proximity to a region of a mobile device 634 with an onboard camera 632, the retainer portion 916 can be removably attached to a region of the mobile device 634 such that an optical portion or lens (not shown) on the retainer portion can be positioned in optical communication with the onboard camera 632. When the onboard camera 632 protrudes above the first surface 918, the auxiliary optical device 900 can include one or more features that receive and/or securely attach to the protruding onboard camera 632.

For example, the auxiliary optical device 900 can comprise a locking member 950 that can be positioned in a plurality of different positions or stages. As illustrated in FIGS. 9A and 9B, the locking member 950 in a first, open, or unlocked stage can be positioned outside of the passageway 910, or positioned so as not to impede or interfere with the passage of the onboard camera 632 through the passageway 910. As illustrated in FIG. 9C, the locking member 950 in a second, closed, or locked stage can be positioned within the passageway 910, or positioned so as to impede or resist or prevent the passage of the onboard camera 632 through the passageway 910. In some embodiments, as illustrated, the locking member 950 in the first stage can be positioned in a lateral or generally vertical position so as to provide space for the passage of the protruding onboard camera 932 through the passageway 910, and the locking member 950 in the second stage can be position in generally transverse or generally horizontal position so as to extend across at least a portion of the passageway 910. The passageway 910, or any other similar structures in other embodiments disclosed in this specification, can be oriented in different ways, and the locking member 950 can be oriented in correspondingly different ways.

In some embodiments, as illustrated, at least a portion of the locking member 950, such as an upper or inner edge that is configured to abut against or block a protruding onboard camera 632, can be sized, shaped, and/or contoured to generally correspond or generally match at least a portion of an edge or arc of a protruding onboard camera 632. For example, as shown, an inner edge of the locking member 950 can comprise a concavely curved shaped that is configured to generally correspond with or generally match a round or circular outer circumference or perimeter of a protruding onboard camera 632 to provide a tight, snug, and/or secure fit against the protruding onboard camera 632.

The locking member 950 can be operatively connected with a user-accessible actuator 960, such as a dial, knob, lever, and/or switch, etc., such that movement of the actuator 960 effectuates movement of the locking member 950. In the illustrated embodiment, the actuator 960 is a dial that is configured to be grasped by the user and rotated, as shown by arrow 970, so as to move the locking member 950 between the first and second stages, permitting the auxiliary optical device 900 to be attachable to the mobile electronic communication device or to be secured or affixed onto the mobile electronic communication device. In some embodiments, the actuator 960 can be biased toward a particular stage, such as the second or locking stage. For example, the dial and locking member 950 can be automatically, or passively, positioned in the position as illustrated in FIG. 9C, so as to block the withdrawal of the protruding onboard camera from the auxiliary optical device 900. When a user temporarily moves the actuator 960 into the open or unlocked position shown in FIGS. 9A and 9B, a biasing force can be exerted against the user which urges the actuator 960 back toward the closed or locked position shown in FIG. 9C. The biasing force can be provided by any suitable means, such as a coil spring, a resilient member, and/or a torsion member, etc.

FIGS. 10A-10C illustrate another example of an auxiliary optical device 1000 with a passive attachment system. The auxiliary optical device 1000 can include one or more of the following: a retainer portion 1030 that is configured to removably attach to a mobile electronic communication device 634; and an optical assembly 1005 comprising an optical holder or a lens holder 1010 and an optical region or lens 1020. In some embodiments, the mobile device 634 to which the auxiliary optical device 1000 is configured to attach comprises a surface disuniformity or irregularity or non-planar portion, such as a protruding onboard camera 632 that may include a protective structure such as a ring. In contrast, a retainer portion that is configured to receive a planar surface of a mobile device, such as the retainer portion 406 illustrated in FIGS. 1A-3C, may not be able to receive a mobile device 634 with a protruding onboard camera 636 because the thickness of the body of the mobile device plus the additional thickness of the protruding onboard camera 636 may exceed the width of the receiving groove 416 of the retainer portion 406.

The retainer portion 1030 can comprise one or more of: a first face configured to permanently or removably received the optical assembly 1005, a second face on an opposing side from the first face, and one or more side and/or top walls 1130 extending between the first face and the second face. In some embodiments, different structures and/or orientations may be utilized that do not include each of these faces and/or walls. A groove or receiving region can be provided in the auxiliary optical device 1000 that is configured to receive at least a portion of the mobile device 634 that includes an onboard camera 632. In some embodiments, the retainer portion 1030 and/or any or all of its associated components or parts are rigid; and in some embodiments, the retainer portion 1030 and/or any or all of its associated components or parts are flexible or resilient.

As shown in FIGS. 10A and 10C, the retainer portion 1030 of the auxiliary optical device 1000 can comprise an internal cavity 1040 with an interior surface 1050 that includes one or more engagement surfaces 1060. One or more of the engagement surfaces 1060 can comprise one or more entrance-facilitating surfaces 1070 and/or one or more exit-facilitating surfaces 1080. For example, in some embodiments, an entrance-facilitating surface 1070 can comprise a slanting or tapering surface along the interior surface 1050 that increases in height or inward extension into the internal cavity 1040 in the direction from the entrance of the internal cavity 1040 into the internal cavity 1040; and an exit-facilitating surface 1080 can comprise a slanting or tapering surface along the interior surface 1050 that increases in height or inward extension into the internal cavity 1040 in the direction from inside the internal cavity 1040 toward the entrance of the internal cavity 1040. In some embodiments, a zenith or summit or facet 1090 of an engagement surface 1060 comprises a location where one or more engagement surfaces 1060 converge and/or where a maximum height or inward extension into the internal cavity 1040 occurs along a path configured to be traversed by a protruding onboard camera 632 during attachment of the auxiliary optical device 1000 to a mobile device 634.

In some embodiments, as illustrated, when a portion of a mobile electronic device 634 is initially inserted into the groove or interior cavity 1040 of the auxiliary optical device 1000, before the onboard camera 632 contacts the engagement surface 1080, the distance between a first surface 1100 of the mobile electronic device 634 and the engagement surface 1080 (e.g., between the summit or zenith or facet 1090 of the engagement surface 1080 and the first surface 1100) can be greater than the distance between the outermost surface of the onboard camera 632 and the engagement surface 1080 (e.g., between the summit or zenith or facet 1090 of the engagement surface 1080 and the outermost surface of the onboard camera 632).

When the mobile device 634 is advanced further into the interior cavity 1040 of the auxiliary optical device 1000, the protruding onboard camera 632 can contact an engagement surface 1080, producing an outwardly directed force on the engagement surface 1080. In some embodiments, especially those in which the engagement surface 1080 is made of a resilient, flexible, low-durometer material, and/or a movable structure, the outwardly directed force can temporarily displace (e.g., compress, flex, crush, or otherwise move) the engagement surface 1080 outwardly to permit passage of the protruding onboard camera 632 past the engagement surface 1080. Upon movement of the engagement surface 1080, a responsive force can be passively created that urges the engagement surface 1080 back toward its original configuration (e.g., its shape, position, and/or orientation). Once the onboard camera 632 has passed by the engagement surface 1080, the responsive force can cause the engagement surface 1080 to move back toward its original configuration, thereby trapping the onboard camera 632 in the interior cavity 1040, especially at the stage when an upper edge 1120 of the mobile device 634 is fully positioned inside of the interior cavity 1040 such that it contacts or is adjacent to an interior wall of the interior cavity 1040. When a user desires to remove the auxiliary optical device 1000 from the mobile electronic communication device 634, the user can apply a removal force to the auxiliary optical device 1000 that is sufficient to once against temporarily displace the engagement surface 1080 to permit withdrawal of the onboard camera 632 from the interior cavity 1040 of the auxiliary optical device 1000.

The retainer portion 1030 can comprise one or more expansion portions 1110 configured to permit the retainer portion 1030 and/or the interior cavity 1040 to expand or otherwise move. As illustrated in FIGS. 10A-10B, the expansion portion 1110 can comprise a slot or groove in one or more walls or other structures of the retainer portion 1030. As with all other structures, steps, methods, or components illustrated and/or described in any embodiments in this specification, any feature of the adjusters 508, 510 of FIGS. 4A-4C and/or 5, and/or any related or associated features of other components of those figures, can be used instead of or in addition to the expansion portion 1100 of the embodiment of FIGS. 10A-10C.

Figure 11A:
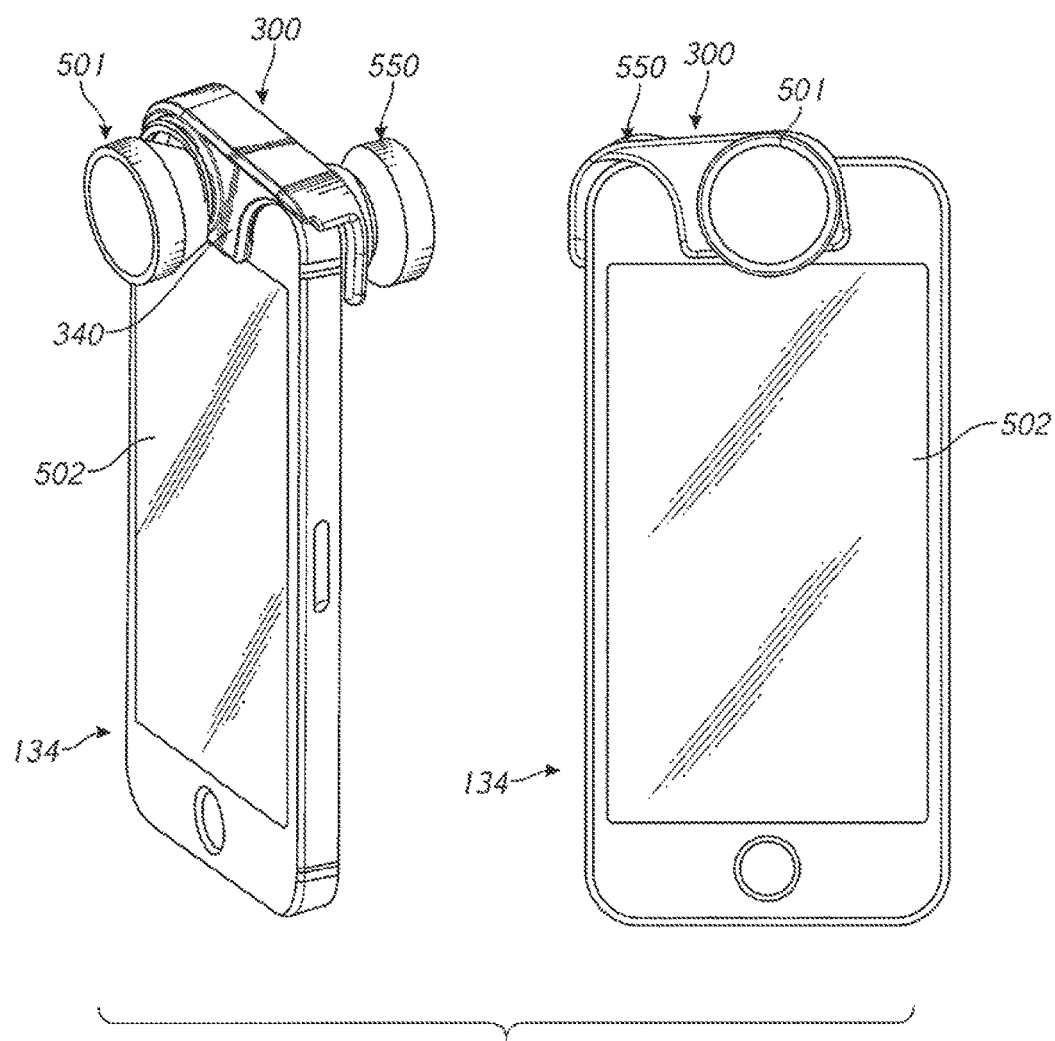
FIGS. 11A-11B illustrate an example of an auxiliary lens system that comprises at least two optical regions that are each configured to be in simultaneous optical communication with a respective one of at least two lenses of onboard cameras in a mobile communication device.
Figure 11B:
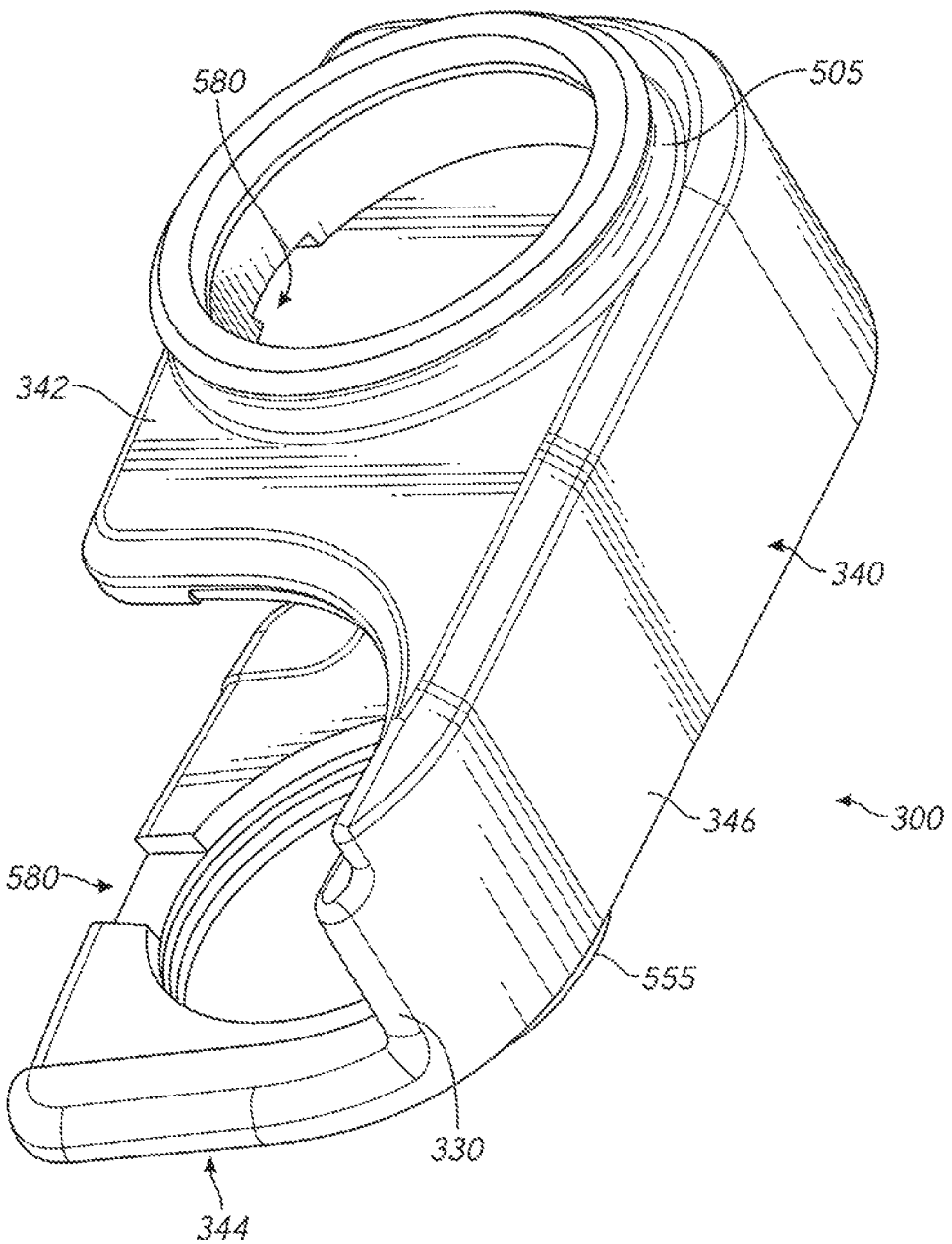

As illustrated in FIGS. 11A and 11B, in some embodiments, a multi-lens system 300 can provide a plurality (e.g., two) of optical regions or lenses 501, 550 that are each configured to be in general optical alignment simultaneously with respective different ones of at least two onboard cameras of a mobile communication device 134. For example, at the same time, a first optical region or lens 501 of the multi-lens system 300 can be positioned in alignment with or in a covering or overlapping arrangement with a first onboard camera lens, and a second optical region or lens 550 of the multi-lens system 300 can be positioned in alignment with or in a covering or overlapping arrangement with a second onboard camera lens. In some embodiments, the first onboard camera of the mobile communication device 134 can be configured to face in generally the same direction as the user-viewable screen 502 of the mobile communication device 134, which can be configured to capture images (e.g., photographs or video) of a user of the mobile communication device 134 and the user's surroundings, and the second onboard camera of the mobile communication device 134 can be configured to face in generally the opposite direction from the first onboard camera and can capture images in a direction facing away from a user.

The multi-lens system 300 can comprise a retainer with a retainer body 340 that is configured to removably attach to a mobile communicative device 134. In some embodiments, as illustrated, the retainer body 340 is configured to attach to the mobile communication device 134 by way of a friction fit in a single attachment motion, without requiring pre-attached mounts on the mobile communication device 134 and/or without requiring one or more dynamic mounts (e.g., screws, clamps, levers, etc.) on the retainer body 340. As with all other embodiments in this specification, any structure, component, material, step, or method described and/or illustrated elsewhere in this application can be used in addition to or instead of those described and/or illustrated in this embodiment. For example, any manner of attaching a retainer to a mobile communication device can be used in addition to or instead of those described and/or illustrated in this embodiment, and any lenses or optical zones described and/or illustrated elsewhere in this application can be utilized in addition to or instead of those described and/or illustrated in this embodiment. In some embodiments, as shown, the retainer body 340 can be unitary in that it is formed of a single piece of material.

As shown in FIG. 11B, the multi-lens system 300 can comprise first and second lens mounting portions 505, 555 that are configured to receive optical zones or lenses 501, 550. In some embodiments, the optical zones or lenses 501, 550 are removably and/or interchangeably attached to the retainer body 340. As illustrated in FIG. 11A, in some embodiments, the retainer body 340 can attach to the mobile communication device 134 such that a first side wall 342 of the multi-lens system 300 is configured to contact or overlap a first side of the mobile communication device 134; a second side wall 344 of the multi-lens system 300 is configured to contact or overlap a second side of the mobile communication device 134 that is opposite from the first side of the mobile communication device 134; and/or an upper wall 346 of the multi-lens system 300 is configured to contact or overlap a top edge of the mobile communication device 134. In some embodiments, an upper wall alignment portion 330 can be configured to contact or overlap with a corner region of the mobile communication device 134 to help in properly aligning or registering or positioning the retainer body 340 on the mobile communication device 134 to provide proper optical communication between the onboard lenses and the lenses or optical zones of the multi-lens system 300.

In some embodiments, as shown in FIG. 11B, the multi-lens system 300 can comprise a receiving or guiding structure 580 that is configured to assist in guiding or attaching the multi-lens system 300 to a mobile communication device that includes one or more non-planar surfaces, such as a mobile communication device that includes one or more raised onboard lenses or cameras on one or more (e.g., two) sides that protrude outwardly from the surface of the mobile communication device in which such lenses or cameras are embedded. As illustrated, the receiving or guiding structure 580 can be a recessed groove with a depth that is generally equal to or greater than the thickness of the protruding portion of the corresponding raised onboard lens or camera and/or with a width that is generally equal to or greater than the diameter or cross-sectional width of the corresponding raised onboard lens or camera. The receiving or guiding structure 580 can have many other different shapes, sizes, forms, and/or configurations. For example, the receiving or guiding structure can be a protrusion or a series of protrusions and/or a resilient, flexible, or compliant region, and/or any other structure that is suitable to permit a surface protrusion on a mobile communication device to pass within or near or adjacent to a portion of the multi-lens system 300 during attachment. In some embodiments, the multi-lens system 300 can comprise one or two (as shown) or more receiving or guiding structures 580 on the same retainer body 340. For example, in some embodiments, there can be at least one guiding structure 580 for each lens or optical region 501, 550 of the multi-lens system 300. In some embodiments, as disclosed elsewhere herein, there can be multiple guiding structures for the same lens or camera, such as to permit alternative paths of attachment. The guiding structures can be orientated in any manner (e.g., generally vertically, as illustrated, or generally diagonally, or generally horizontally, etc.).

As with all features disclosed herein, the receiving or guiding structure 580 in this embodiment can be replaced with or include any features of any other structure, step, material, or component that is described and/or illustrated elsewhere in this specification for any other structure that is used to receive or attach to or accommodate a protruding camera on a mobile communication device, such as the receiving structure or channel 615 of FIG. 6B, the passage 710 and/or seat 716 of FIGS. 7A-7C, the passageway 810 of FIGS. 8A and 8B, the passageway 910 of FIGS. 9A-9C, and/or the internal cavity 1040 of FIG. 10A-10C, etc.

As with other embodiments disclosed herein, the retainer body 340 can be configured, as shown, to be switchable in orientation so as to permit either of the two or more lenses or optical regions 501, 550 of the multi-lens system 300 to be positioned in optical communication with either of the two or more lenses of the onboard cameras of the mobile communication, without requiring removal of either of the lenses or optical regions 501, 550 from the retainer body 340 of the multi-lens system 300. For example, the multi-lens system 300 can be attached in a first orientation to a mobile communication device such that a first lens or optical region 501 of the multi-lens system 300 is in optical alignment with a first onboard camera in the mobile communication device 134 and a second lens or optical region 550 of the multi-lens system 300 is in optical alignment with a second onboard camera in the mobile communication device 134 at the same time, then the multi-lens system 300 can be removed from the mobile communication device and reattached to the mobile communication device in a second orientation such that the first lens or optical region 501 of the multi-lens system 300 is in optical alignment with the second onboard camera in the mobile communication device 134 and the second lens or optical region 550 of the multi-lens system 300 is in optical alignment with a first onboard camera in the mobile communication device 134 at the same time.

As shown in the examples of FIGS. 12A-15C, many different structures and methods can be used, alone or in combination with any other structures and/or methods disclosed elsewhere in this specification, to attach a retainer of an auxiliary lens system to a mobile communication device comprising a protruding portion, such as a protruding onboard camera. As with all embodiments in this specification, any feature, component, material, structure, and/or step described and/or illustrated in these embodiments can be used in combination with or instead of any feature, component, material, structure, and/or step described an/or illustrated in any other embodiments in this specification. For example, any one or a plurality of the lens or optical region described elsewhere in this specification can be used with any retainer portion in the embodiments of FIGS. 12A-15C; and any retainer portion shown in the embodiments of FIGS. 12A-15C can be appropriately configured to include any of the features of any of the retainer portions of the other embodiments in this specification.

In some embodiments, as illustrated in FIG. 12A-12E, a retainer portion 200 can be configured, as with other retainer portions in this specification, to removably attach to a mobile communication device 134 with at least one onboard camera 634 that protrudes above or beyond a generally planar or generally flat surface 610 in which the onboard camera 634 is embedded. The retainer portion 200 can comprise at least one or a plurality of lens-receiving regions 202 configured to receive one or more optical regions or lenses (not shown).

The retainer portion 200 can comprise at least two portions that are moveable with respect to each other. A first portion 204 can comprise a first side 208, a second side 210, a top edge 212, a lateral edge 214, one or more interior sides 215, 225, and one or more interior edges 213. A second portion 206 can comprise a first side 216, a second side 218, a top edge 220, a lateral edge 222, one or more interior sides 217, 223, and one or more interior edges 219. As shown, the first side 208 of the first portion 204 can face in a generally opposite direction from the second side 218 of the second portion 206. The first and second portions 204, 206 can be attached and/or can fit together and/or can contact each other in an interlocking or interleaved or a multi-faceted way. For example, as illustrated, the first portion 204 and the second portion 206 can be moveably attached or moveably operable with each other in such a way that multiple (e.g., at least: two or three or four, etc.) respective sides or edges of the first and second portions 204, 206 contact and/or slide against each other at the same time.

In some embodiments, as illustrated in FIGS. 12A-12E, the distance between the first side 208 of the first portion 204 and the second side 218 of the second portion 206 can be varied or adjusted by sliding the first portion 204 further in a first direction than the second portion 206. As illustrated, the distance from the first side 208 of the first portion 204 to the second side 210 of the first portion 204 can be greater than the distance from the first side 216 of the second portion 206 to the second side 218 of the second portion 206. When the first and second portions 204, 206 are in a first configuration, a gap 224 can be formed between an interior side 215 of the first portion 204 and an interior side 217 of the second portion 206, while the first side 208 of the first portion 204 and the first side 216 of the second portion 206 are generally flush. When the first and second portions 204, 206 are in a second configuration, the gap 224 can be eliminated or decreased, but another gap 226 can be formed or increased between other respective interior sides 225, 223 of the first and second portions 204, 206. In some embodiments, the width of the gap 226, between the interior sides 225, 223 can correspond to the size of the protruding portion of the onboard camera 632 of the mobile communication device 634.

A groove or other opening (not shown) can be provided underneath the retainer portion 200 that is sized and shaped to removably receive one or more edges, such as a top edge and one or more side edges of the mobile communication device 634. In some embodiments, when the retainer portion 200 is received on the mobile communication device 634, only a single gap 224, 226 can be formed in a particular configuration, depending on the positioning of the respective first and second portions 204, 206. In some embodiments, a biasing member, such as a resilient member or spring or functionally similar structure, can bias the retainer portion toward the position in which there is no gap 226 or essentially no gap to accommodate the protruding portion of the onboard camera 632, until a temporary force is applied by a user to create the gap 226, at which point a biasing force is exerted by the biasing member to help retain the retainer portion 200 on the mobile communication device 634.

As illustrated in FIGS. 13A-14C, a retainer portion 240 can comprise one or more lens-receiving regions 242 that are configured to receive any type of lens or optical region. The one or more lens-receiving regions 242 can be configured to move with respect to the body of the retainer portion 240. In some embodiments, as illustrated, in a first configuration the lens-receiving region 242 can be generally flush with a face 244 of the retainer portion 240 and in a second configuration the lens-receiving region 242 can protrude from the face 244 of the retainer portion. In some embodiments, as shown, the lens-receiving region 242 can be comprised or be supported by a moving region 246 that is flexible or resilient or compliant. For example, the moving region 246 can comprise silicone or rubber. Many other materials and/or structures can be used. As illustrated, the retainer portion 240 can comprise an underside groove 248, as in other embodiments, that can extend across all or a portion of the retainer portion 240 and that is sized and/or shaped to receive at least a portion of a mobile communication device 634 with a protruding camera 632, such as one or more edges, or corners, and/or a top portion of the mobile communication device 634. In some embodiments, including those described and/or illustrated in connection with FIGS. 13A-14C, the retainer portion 240 itself can expand and/or contract or otherwise move to accommodate attaching to a mobile communication device with a protrusion, such as a protruding onboard camera, on its surface, such as is illustrated and/or described in connection with the embodiments of FIGS. 4A-4C and 5.

As shown in FIGS. 15A-15C, in some embodiments, a retainer portion 250 can comprise one or more lens-receiving regions 252, 254 that are configured to move independently of each other and/or of the body of the retainer portion 250. One or more other embodiments illustrated and/or disclosed in this specification also permit independent or floating movement of two or more lens-receiving regions. In some embodiments, the independent or floating movement of the one or more lens-receiving regions 252, 254 can permit the retainer portion 250 to be removably attached to a mobile communication device 634 with a protruding onboard camera 632. The lens-receiving regions 252, 254 can be attached to the body of the retainer portion 250 by a respective moving region 256, such as a bendable (as shown) or flexible or resilient link or a retracting, expanding, or otherwise moving member. In some embodiments, as the moving region 256 moves, one of more of the lens-receiving regions 252, 254 and one or more of the optical components received in them can be configured to move along a generally straight line that is coaxial with or generally parallel with an optical axis of an onboard camera of the mobile communication device, such that moving of the moving region 256 does not cause the optical component to veer off the optical axis. In any embodiment disclosed in this specification, including the embodiments of FIGS. 12A-15C, the body of the retainer portions can comprise a suitably configured receiving or guiding structure, such as those described and/or illustrated in other embodiments in this specification.

Figure 16A:
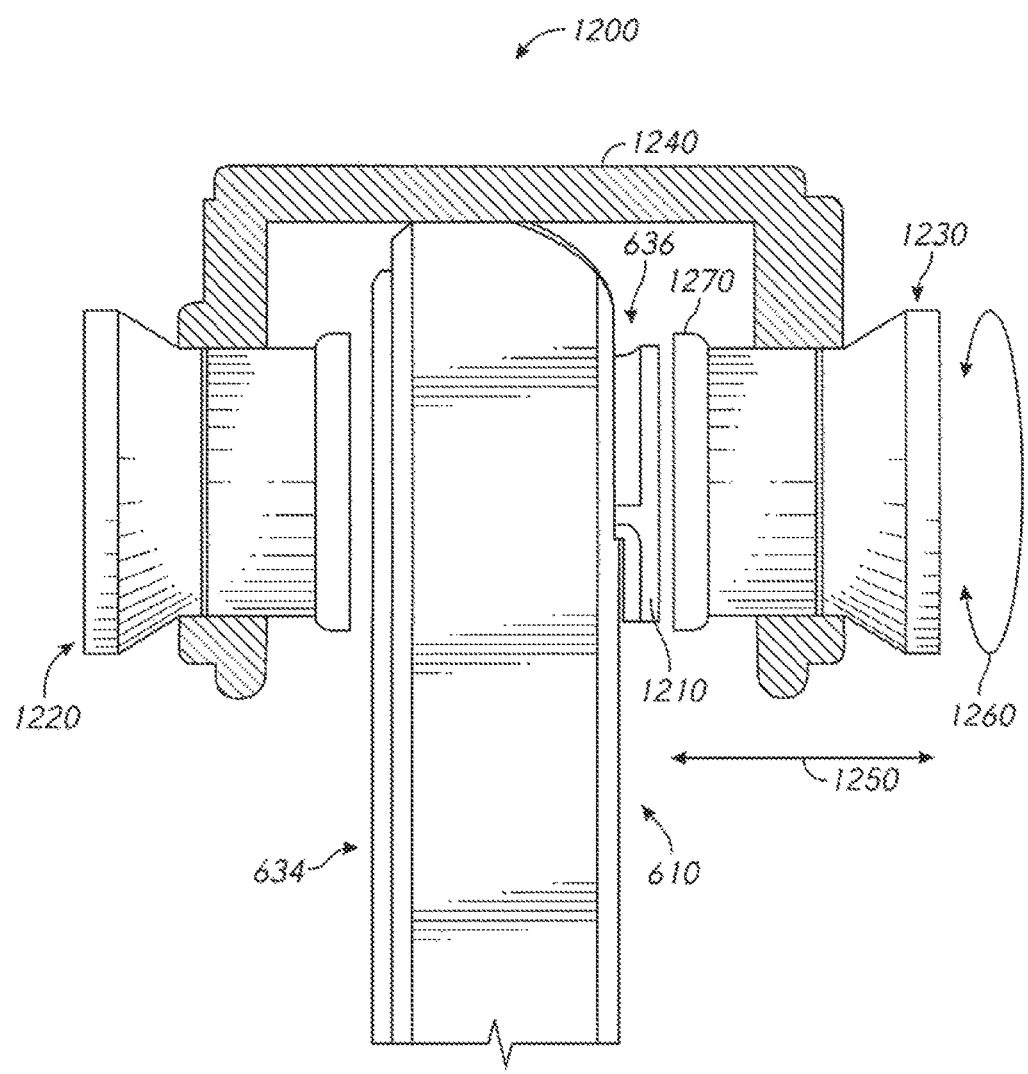
FIGS. 16A-16B illustrate examples of side cross-sectional views of other auxiliary lens systems that can be utilized on mobile communication devices that have one or more protruding features.

As shown in FIG. 16A, in some embodiments, an auxiliary lens system 1200 can be configured to removably attach to a mobile communication device 634 comprising a protruding portion, such as a protective structure 636 near or generally surrounding a lens, that includes one or more mounting elements 1210 configured to assist in attaching one or more optical components 1220, 1230 to the mobile communication device 634. The mobile communication device 634 can comprise one of more of any features, structures, components, steps, and/or materials of any of the mobile communication devices disclosed and/or illustrated in U.S. Pat. No. 8,687,299, issued on Apr. 1, 2014 to Apple Inc., which is incorporated by reference herein in its entirety. In some embodiments, the one or more mounting elements 1210 can comprise a screw thread, bayonet mount, or other structure configured to attach to another component using a rotating motion.

As illustrated, the one or more optical components 1220, 1230 can be permanently or removably attached to a retainer portion 1240. A first optical component 1220 can face in a first direction when mounted to the retainer portion 1240 and a second optical component 1230 can face in a second direction that is generally opposite from the first direction when mounted to the retainer portion 1240. The retainer portion 1240 can be configured to removably attach to the mobile communication device 634. As with all embodiments in this specification, any structure, feature, component, material, and/or step that is illustrated and/or described in one embodiment can be used with or instead of any structure, feature, component, material, and/or step that is illustrated and/or described in any other embodiment. For example, the retainer portion 1240 can comprise any feature or can be made to perform any step described and/or illustrated in connection with any other retainer portion in this specification, and the optical components 1220, 1230 can comprise any feature or can be made to perform any step described and/or illustrated in connection with any other optical components in this specification.

The one or more optical components 1220, 1230 can be removably attachable to the retainer portion 1240 or permanently attached to the retainer portion 1240. In some embodiments, as illustrated in FIG. 16, at least one of the optical components 1230 can be configured to move back and forth along its longitudinal axis (as shown by reciprocating line 1250) within an aperture of the retainer portion 1240, while being retained by the retainer portion 1240 (e.g., without being removable from the retainer portion 1240 through longitudinal movement). In some embodiments, at least two of the optical components 1220, 1230 can be so configured. At least one of the optical components 1230 can be configured to rotate within an aperture of the retainer portion 1240, around its longitudinal axis (as shown by reciprocating line of rotation 1260), while being retained by the retainer portion 1240 (e.g., without being capable of unscrewing or otherwise being removed from the retainer 1240 through rotation). In some embodiments, at least two of the optical components can be so configured. As illustrated, in some embodiments, at least one optical component 1230 can both freely rotate and move longitudinally within an aperture in the retainer portion 1240.

The rotation and/or longitudinal movement of the optical component 1230 can enable the optical component to be removably attached to a mounting structure on a mobile communication device 634, such as the protective structure 636. For example, as shown, the retainer portion 1240 can be positioned over a portion of a mobile communication device 634, such that at least a portion (e.g., an edge or a corner) of the mobile communication device 634 is positioned within an interior cavity of the retainer portion 1240. The optical component 1230 can be slid longitudinally so that an interior portion 1270 is advanced toward the mounting structure on the mobile communication device 634. After the optical component 1230 contacts the mounting structure of the mobile communication device (if not before), the optical component 1230 can be rotated to removably secure the auxiliary lens system 1200 to the mounting structure of the mobile communication device 634. An inside surface of the interior portion 1240 can comprise a corresponding attachment structure (e.g., a screw thread or a bayonet mount) that is configured to removably attach to the mounting element (e.g., a screw thread or a bayonet mount) of the mounting structure of the mobile communication device 634. When the at least one optical component 1230 is removably attached to the mounting element 1210, the optical component 1230 can be configured to be in optical communication with an onboard camera of the mobile communication device. In some embodiments, as shown, the positions of the first and second optical components 1220, 1230 can be switched to provide different optical capabilities.

In some embodiments, the one or more optical components 1220, 1230 can be biased toward one or a plurality of positions by a resilient member, such as a spring. For example, in a first stage, the one or more optical components 1220, 1230 can be biased toward a first position to provide a space for inserting at least a portion of the mobile communication device 634 within the retainer portion 1240. When actuated by a user, the auxiliary lens system 1200 can bias the one or more optical components 1220, 1230 toward a second position for attachment with the mounting structure on the mobile communication device.

Figure 16B:
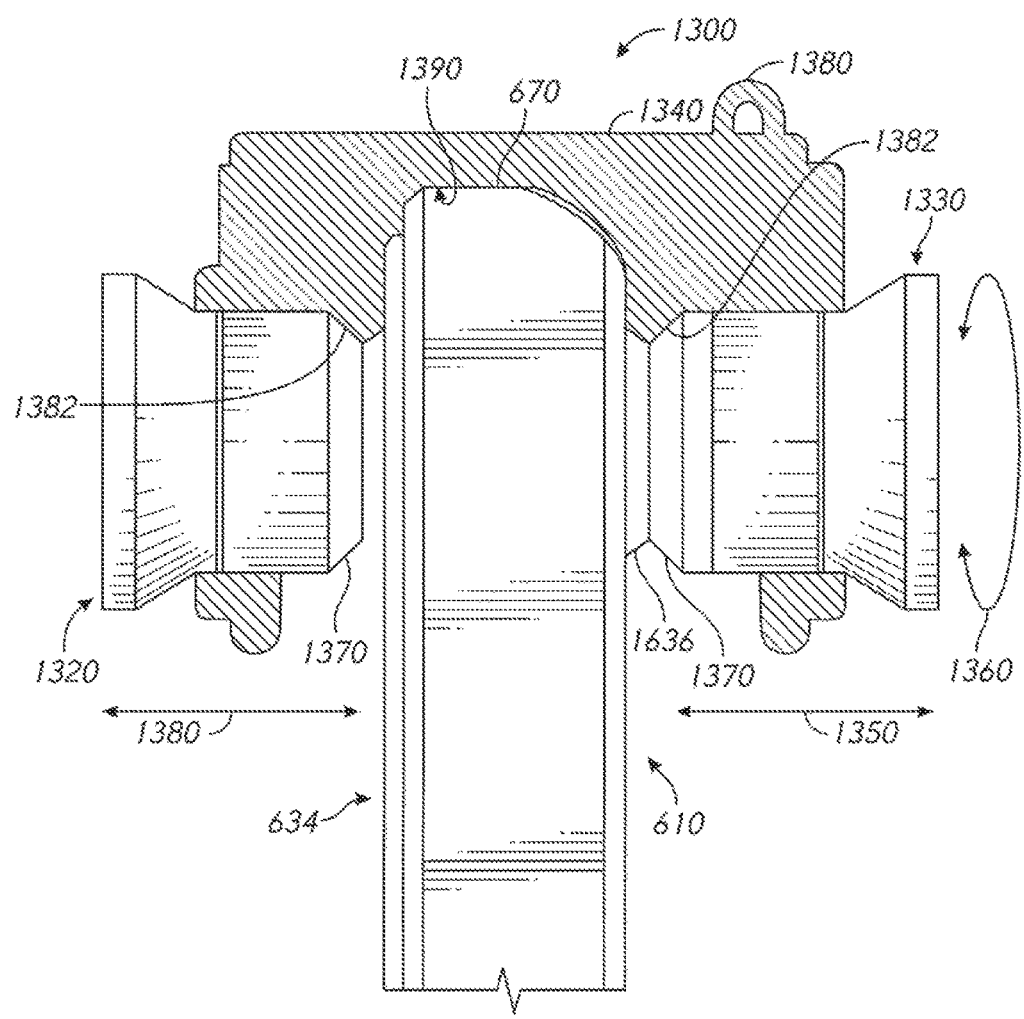

FIG. 16B provides another example of an auxiliary lens system 1300 that is configured to be removably attachable with a mobile electronic communication device 634. As with all embodiments in this specification, any feature, structure, component, step, and/or material that is illustrated or described in connection with the auxiliary lens system 1300, or any other lens system in this specification, can be used with or instead of any feature, structure, component, step, and/or material that is disclosed in connection with the embodiment of FIG. 16B.

The auxiliary lens system 1300 of FIG. 16B comprises a retainer portion 1340 that has an interior surface 1390 within an interior region. At least a portion of the interior surface 1390 can be contoured, shaped, and/or sized to closely correspond to or match an exterior surface 670 of the mobile electronic communication device 634 to which the auxiliary lens system 1300 is configured to attach. In some embodiments, as illustrated, the interior surface 1390 is configured to tightly or snugly contact or grip an exterior surface 670 of the mobile electronic communication device 634 on at least one side (e.g., a front or rear face) or on at least two sides (e.g., a front and rear face) or on at least three sides (e.g., a front and rear face and a top surface) to assist in properly locating or registering the auxiliary lens system 1300 at the proper location on the mobile electronic communication device 634 and/or to assist in retaining the auxiliary lens system 1300 on the mobile electronic communication device 634.

The interior surface 1390 can be made of the same material as the rest of the retainer portion 1340 or it can be made of a different material. In some embodiments, at least a portion of the interior surface 1390 is formed of a flexible or resilient material (e.g., silicone, thermoplastic polyurethane (TPU), thermoplastic elastomer (TPE), plastic, etc.) that is separately applied on the interior of the retainer portion 1340, such as by overmolding or by adhesive or by any other suitable method. The retainer portion 1340 can be formed of a rigid material, such as a rigid plastic or metal, or it can be formed of a relatively flexible or resilient material.

As shown, the auxiliary lens system 1300 can comprise an attachment structure, such as an attachment loop (as illustrated) or a connector or snap or clasp, to facilitate connection with a carrying or storage device, such as a lanyard, case, bracelet, or necklace, etc.

In some embodiments, as shown, first and second optical components 1320, 1330 can each comprise an interior attachment-facilitating structure, such as a bevel or ramp, on the interior end 1370 that is configured to contact or engage with a permanently attached protruding structure 1636 (e.g., a protruding lens or a protective structure surrounding a protruding lens) on the mobile electronic communication device 634. As illustrated, the protruding structure 1636 on the mobile electronic communication device 634 may comprise one or more smooth, sloped, tapered, and/or ramped edges, without any attachment structure, as in the iphone 6, sold by Apple, Inc.

As illustrated, in some embodiments, an interior end 1370 of either or both of the optical components 1320, 1330 can be configured to contact a front face of the onboard lens of the mobile electronic communication device 634. The interior end 1370 can be made of a rigid or a resilient or flexible material. In some embodiments, the interior end 1370 forms a light gasket or light seal or a cushion against the onboard lens. The interior end 1370 can surround the periphery of the onboard lens when the auxiliary optical device 1300 is attached to the mobile electronic device 634 to block out peripheral light. As illustrated, in some embodiments, the diameter of the protruding structure 1636 is approximately the same as the diameter of the interior end 1370. In some embodiments, the diameter of the interior end 1370 is larger than the diameter of the protruding structure 1636. As shown, an interior ledge 1382 of the retain portion 1340 can be a stop against which the interior end 1370 abuts, such as in a biased position.

In some embodiments (not shown), one or more of the optical components 1320, 1330 can be sufficiently long so as to contact the front face of the mobile electronic communication device 610 when moved to a fully inward position along axes 1350, 1380, such as when there is no interior ledge 1382 to block such movement. Either or both of the optical components 1320, 1330 can be biased toward such a fully inward position by a biasing member such as a spring or resilient member. As the auxiliary lens system 1300 is moved into position on a mobile electronic communication device 634 for attachment, the interior attachment-facilitating structure of the auxiliary lens system 1300 can contact and push laterally against a sloping edge of the protruding structure 1636 on the mobile electronic communication device 634, which can advance the optical component 1320, 1330 outwardly along line 1350 (against the bias, if present) to provide an increased space to accommodate the protruding structure 1636 within the interior of the retainer portion 1340 during attachment. The inwardly-directed bias can help the auxiliary optical system 1300 to pinch or clamp or squeeze or snugly fit against one or two or more exterior surfaces of the mobile electronic communication device, even after one or more of the optical components 1320, 1330 has been pushed outwardly by the attachment-facilitating structure.

One or more of the optical components 1320, 1330 can be rotated in one or more directions as shown by rotation line 1360. In some embodiments, as shown, there are no screw threads or other attachment members on the interior end 1370. The rotation can serve to actuate a function of the auxiliary optical system 1300, such as to trigger an inward bias of one or more of the optical components 1320, 1330 or to lock the auxiliary optical system 1300 into place or to adjust focus or magnification or polarization or some other variable optical quality.

Any combinations of embodiments or combinations of subsets or subassemblies from any embodiments in this specification can be used together. For example, and without limitation, any features of any lens or optical portion or retainer portion of the embodiments disclosed and/or illustrated in connection with any embodiments disclosed herein can be used with any adjuster, or any receiving structure, and/or any securing or affixing or locking structure.

What is claimed is:

1. A multi-lens system for removable attachment to a mobile device, the mobile device having a top portion with a user-facing onboard camera and an outward-facing onboard camera, the multi-lens system comprising:
   a retainer portion defining a channel configured to receive the top portion of the mobile device, the retainer portion including a biasing structure within the channel and configured for engagement of the mobile device adjacent at least one of the user-facing onboard camera or the outward-facing onboard camera;
   a first lens component connected to the retainer portion and arranged for optical communication with the user-facing onboard camera; and
   a second lens component connected to the retainer portion, positioned opposite the first lens component, and arranged for optical communication with the outward-facing onboard camera.

2. The multi-lens system of claim 1, wherein: the retainer portion comprises:
   a first sidewall portion; and
      a second sidewall portion separated from the first sidewall portion by the channel;
      the first lens component is connected to the first sidewall portion;
      the second lens component is connected to the second sidewall portion; and
      when the mobile device is received within the channel, the first lens component is in optical communication with the user-facing onboard camera and the second lens component is in optical communication with the outward-facing onboard camera.

3. The multi-lens system of claim 2, wherein:
   the retainer portion further comprises a lens mounting portion protruding from the first sidewall portion or the second sidewall portion; and
   one of the first lens component or the second lens component is housed at least partially within the lens mounting portion.

4. The multi-lens system of claim 3, wherein:
   one of the user-facing onboard camera or the outward-facing onboard camera define a ring that protrudes from a respective face of the mobile device;
   at least one of the first sidewall portion or the second sidewall portion defines a recessed feature along an interior surface of the channel; and
   the recessed feature is configured to receive the ring of the one of the user-facing onboard camera or the outward-facing onboard camera.

5. The multi-lens system of claim 3, wherein the first sidewall portion and the second sidewall portion contact respective faces of the mobile device when the mobile device is received within the channel.

6. The multi-lens system of claim 5, wherein the biasing structure comprises:
   a restraining member configured for contacting the mobile device; and
   a spring configured for biasing the restraining member into the channel.

7. The multi-lens system of claim 1, wherein:
   the top portion of the mobile device defines a top surface of the mobile device; and
   the retainer portion is configured to seat on the top surface of the mobile device.

8. The multi-lens system of claim 7, wherein:
   the top portion of the mobile device further defines opposing corners, each of the opposing corners connected to the top surface; and the retainer portion is configured to extend over a portion of each opposing corner.

9. A lens system for removable attachment to a mobile device having a protruding onboard camera and a secondary onboard camera opposite the protruding onboard camera, the lens system comprising:
a retainer portion, comprising:
a pair of sidewalls configured to receive the mobile device therebetween, a first sidewall defining a recessed feature configured to receive the protruding onboard camera; and
a moveable portion adjacent the recessed feature and moveable to enlarge a distance between at least two portions of the pair of sidewalls, thereby permitting entry of the mobile device between the pair of sidewalls; and
a first lens component coupled to the retainer portion and in optical communication with the protruding onboard camera when the mobile device is received between the pair of sidewalls; and
a second lens component coupled to the retainer portion and in optical communication with the secondary onboard camera when the mobile device is received between the pair of sidewalls.

10. The lens system of claim 9, wherein the moveable portion is biased for engagement with the protruding onboard camera.

11. The lens system of claim 9, wherein the moveable portion maintains contact with one or more surfaces adjacent the protruding onboard camera when the mobile device is received between the pair of sidewalls.

12. The lens system of claim 9, wherein:
the retainer portion defines an opening through the first sidewall aligned with the first lens component; and
the recessed feature defines a guiding structure for directing the protruding onboard camera from an exterior of the retainer portion toward the opening.

13. The lens system of claim 12, wherein the recessed feature encompasses the opening and defines a seat for the protruding onboard camera.

14. The lens system of claim 9, wherein:
the retainer portion comprises:
a first lens mounting portion connected to, and protruding away from, the first sidewall; and a second lens mounting portion connected to, and protruding away from, a second sidewall; the first lens component is housed at least partially within the first lens mounting portion; and the second lens component is housed at least partially within the second lens mounting portion.

15. A multi-lens system for removable attachment to a mobile device having a protruding onboard camera and a secondary onboard camera opposite the protruding onboard camera, the multi-lens system comprising:
a retainer portion having internal opposing surfaces separated by a gap, the internal opposing surfaces each having an opening arranged for alignment with one of the protruding onboard camera or the secondary onboard camera, one of the internal opposing surfaces including a recessed feature adjacent the opening for the receiving the protruding onboard camera, wherein the retainer portion is arranged to flex for entry of the protruding onboard camera between the internal opposing surfaces and into the recessed feature; and
a pair of lens components, each connected to the retainer portion at a respective one of the openings, wherein, when the protruding onboard camera is positioned between the internal opposing surfaces, each lens component of the pair of lens components is in optical communication with a respective one of the protruding onboard camera or the secondary onboard camera of the mobile device.

16. The multi-lens system of claim 15, wherein each of the internal opposing surfaces is configured to contact a face of the mobile device, thereby resisting sliding of the retainer portion away from the mobile device.

17. The multi-lens system of claim 15, wherein each of the pair of lens components is fixed to the retainer portion.

18. The multi-lens system of claim 15, wherein: the retainer portion comprises:
an upper wall portion;
a first sidewall portion connected to the upper wall portion and defining a first of the internal opposing surfaces; and
a second sidewall portion connected to the upper wall portion and defining a second of the internal opposing surfaces; and
the first sidewall portion and the second sidewall portion arranged to extend over opposing side edges of the mobile device.

19. The multi-lens system of claim 18, wherein each lens component of the pair of lens components defines an arcuate external surface of the multi-lens system.

* * * * *